(12) United States Patent
Nagahama et al.

(10) Patent No.: US 11,296,627 B2
(45) Date of Patent: Apr. 5, 2022

(54) ELECTRONIC WATCH AND METHOD FOR CONTROLLING ELECTRONIC WATCH

(71) Applicant: Seiko Epson Corporation, Tokyo (JP)

(72) Inventors: Reiko Nagahama, Shiojiri (JP);
Takashi Kawaguchi, Shiojiri (JP)

(73) Assignee: Seiko Epson Corporation

(*) Notice: Subject to any disclaimer, the term of this patent is extended or adjusted under 35 U.S.C. 154(b) by 13 days.

(21) Appl. No.: 16/919,340

(22) Filed: Jul. 2, 2020

(65) Prior Publication Data
US 2021/0006187 A1 Jan. 7, 2021

(30) Foreign Application Priority Data

Jul. 3, 2019 (JP) .............................. JP2019-124270
Feb. 4, 2020 (JP) .............................. JP2020-016994

(51) Int. Cl.
*H02P 8/02* (2006.01)
*H02P 8/12* (2006.01)
*H02P 8/16* (2006.01)
*G04C 3/14* (2006.01)

(52) U.S. Cl.
CPC ............... *H02P 8/02* (2013.01); *G04C 3/143* (2013.01); *H02P 8/12* (2013.01); *H02P 8/16* (2013.01)

(58) Field of Classification Search
None
See application file for complete search history.

(56) References Cited

U.S. PATENT DOCUMENTS

| | | | | |
|---|---|---|---|---|
| 4,542,329 A * | 9/1985 | Tu Xuan | ................ | G04C 3/143 310/49.24 |
| 5,166,590 A * | 11/1992 | Tu | ......................... | G04C 3/143 318/685 |
| 5,247,235 A * | 9/1993 | Tu | ......................... | G04C 3/143 318/400.04 |
| 5,504,408 A * | 4/1996 | Tu | ............................ | H02P 8/38 318/685 |
| 2010/0001673 A1 | 1/2010 | Cardoletti et al. | | |
| 2017/0284832 A1* | 10/2017 | Leman | .................... | H02P 6/185 |
| 2017/0366123 A1* | 12/2017 | Saw | ........................ | H02P 6/182 |
| 2020/0295685 A1* | 9/2020 | Imamiya | .................. | H02P 8/38 |

FOREIGN PATENT DOCUMENTS

JP 2009-542186 A 11/2009

* cited by examiner

*Primary Examiner* — Said Bouziane
(74) *Attorney, Agent, or Firm* — Harness, Dickey & Pierce, P.L.C.

(57) ABSTRACT

An electronic watch includes a motor including a coil, a driver controlled to an ON state for supplying a driving current to the coil and an OFF state for not supplying the driving current, a driver controller configured to control the driver to the ON state or the OFF state depending on a value of a current flowing through the coil, and a polarity switcher configured to switch a polarity of the driving current when a prescribed condition is satisfied after detecting that an ON time, which is a duration of the ON state of the driver controller, reaches a maximum.

10 Claims, 18 Drawing Sheets

ELECTRONIC WATCH AND METHOD FOR CONTROLLING ELECTRONIC WATCH

The present application is based on, and claims priority from JP Application Serial Number 2019-124270, filed Jul. 3, 2019, and 2020-016994, filed Feb. 4, 2020, the disclosures of which are hereby incorporated by reference herein in their entirety.

BACKGROUND

1. Technical Field

The present disclosure relates to an electronic watch and a method for controlling an electronic watch.

2. Related Art

There is disclosed in JP 2009-542186 T, a technology in which a supply of current to a coil of a motor is turned off when the current flowing through the coil exceeds the upper threshold value, while the supply of current is turned off when the current flowing through the coil falls below the lower threshold value, and then the position of a rotor of a motor is assumed from an ON time during which a power supply is continued or an OFF time during which the stopping state of the power supply is continued, to control rotation of the motor.

In JP 2009-542186 T, the position of the rotor can be assumed from the ON time or the OFF time, however, the arithmetic circuit for the assumption may become complicated.

SUMMARY

An electronic watch of the present disclosure includes a motor including a coil, a driver controlled to an ON state for supplying a driving current to the coil and to an OFF state for not supplying the driving current, a controller configured to control the driver to the ON state or the OFF state depending on a value of a current flowing through the coil and switch a polarity of the driving current when a prescribed condition is satisfied after detecting that an ON time, which is a duration of the ON state, reaches a maximum.

In the electronic watch of the present disclosure, the prescribed condition is that, after the controller detects that the ON time reaches the maximum, an OFF time, which is a duration of the OFF state of the driver, exceeds a preset determination value.

In the electronic watch of the present disclosure, the prescribed condition is that a preset time elapses from a time when detecting that the ON time reaches the maximum.

In the electronic watch of the present disclosure, the controller may be configured to stop supplying the driving current to the coil from a time when detecting that the ON time reaches the maximum, and may be configured to resume supplying the driving current to the coil when switching the polarity of the driving current.

In the electronic watch of the present disclosure, the controller may be configured to determine that the ON time reaches the maximum when a second ON time, among three consecutive ON times, is longer than first and third ON times.

In the electronic watch of the present disclosure, the controller may be configured to determine that the ON time reaches the maximum when a first ON time, among a plurality of consecutive ON times, is longer than a second ON time.

A movement of the present disclosure includes a motor including a coil, a driver controlled to an ON state for supplying a driving current to the coil and to an OFF state for not supplying the driving current, a controller configured to control the driver to the ON state or the OFF state depending on a value of a current flowing through the coil and switch a polarity of the driving current when a prescribed condition is satisfied after detecting that an ON time, which is a duration of the ON state of the driver controller, reaches a maximum.

A motor control circuit of the present disclosure includes a driver controlled to an ON state for supplying a driving current to a coil of a motor and to an OFF state for not supplying the driving current, a controller configured to control the driver to the ON state or the OFF state depending on a value of a current flowing through the coil and switch a polarity of the driving current when a prescribed condition is satisfied after detecting that an ON time, which is a duration of the ON state of the driver controller, reaches a maximum.

A method for controlling an electronic watch of the present disclosure, which is a method for controlling the electronic watch including a motor including a coil, and a driver controlled to an ON state for supplying a driving current to the coil and to an OFF state for not supplying the driving current, the method including controlling the driver to the ON state or the OFF state depending on a value of a current flowing through the coil, and switching a polarity of the driving current when a prescribed condition is satisfied after detecting that an ON time, which is a duration of the ON state, reaches a maximum.

An electronic watch of the present disclosure includes a motor including a coil, a driver controlled to an ON state for supplying a driving current to the coil and to an OFF state for not supplying the driving current, a controller configured to control the driver to the ON state or the OFF state depending on a value of a current flowing through the coil and switch a polarity of the driving current when a prescribed condition is satisfied after detecting that an ON time, which is a duration of the ON state of the driver controller, reaches a prescribed value or greater.

In the electronic watch of the present disclosure, the prescribed value may be not less than 70% of a maximum value of the ON time measured in advance.

In the electronic watch of the present disclosure, the prescribed condition is that an OFF time, which is a duration of the OFF state of the driver, exceeds a preset determination value.

In the electronic watch of the present disclosure, the controller is configured to determine a drive state of the motor, and to change the prescribed value when the drive state is inappropriate.

DESCRIPTION OF EXEMPLARY EMBODIMENTS

First Embodiment

Hereinafter, an electronic watch 1 of a first embodiment of the present disclosure will be described with reference to the drawings.

Figure 1:
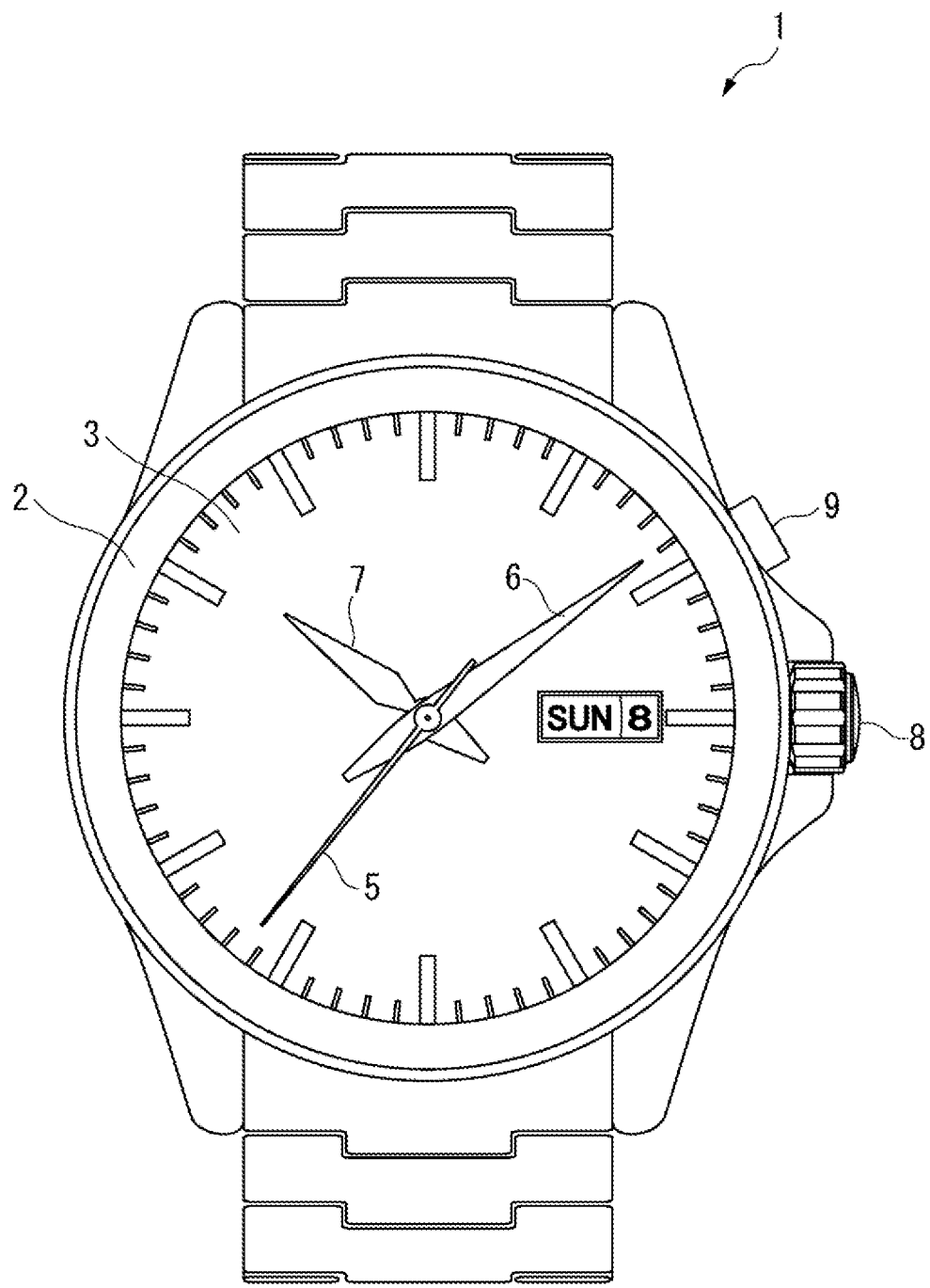
FIG. 1 is a front view illustrating an electronic watch of a first embodiment.
Figure 2:
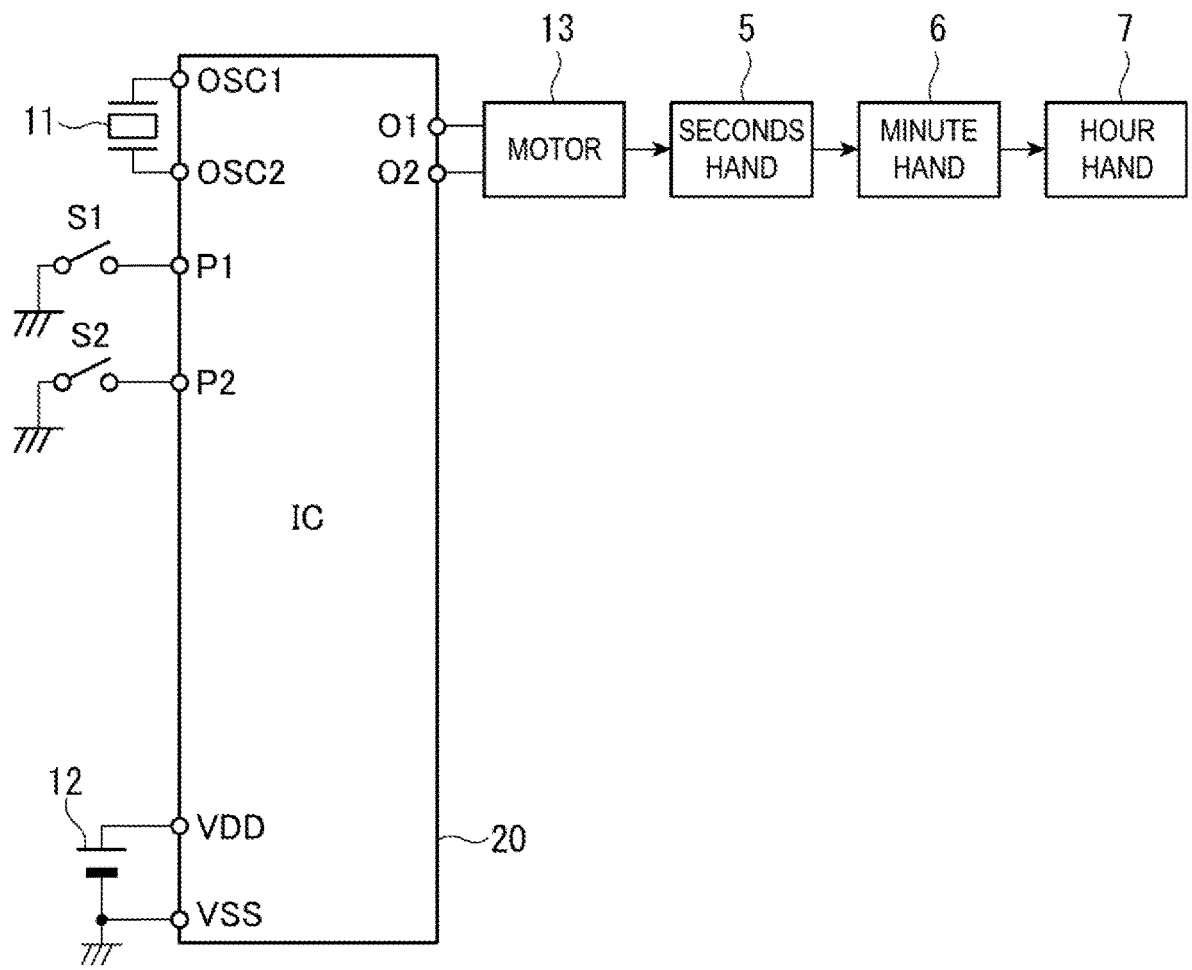
FIG. 2 is a circuit diagram illustrating a circuit configuration of an electronic watch of a first embodiment.

As illustrated in FIG. 1, the electronic watch 1, which is a watch mounted on a user's wrist, includes an outer case 2, a dial 3 having a disk shape, a non-illustrated movement, a seconds hand 5, a minute hand 6, and an hour hand 7, which are hands driven by a motor 13 provided inside the movement, as illustrated in FIG. 2 as well, and a crown 8 and a button 9, which are operation members.

Circuit Configuration of Electronic Watch

As illustrated in FIG. 2, the electronic watch 1 includes a crystal oscillator 11 that is a signal source, a battery 12 that is a power source, a switch S1 that is turned on and off in conjunction with an operation of the button 9, a switch S2 that is turned on and off in conjunction with a drawing-out operation of the crown 8, the motor 13, and an IC 20 for watches.

The motor 13 is a bipolar single-phase stepping motor used for electronic watches, which is driven by a driving current output from output terminals O1 and O2 of the IC 20, as described below.

The seconds hand 5, the minute hand 6, and the hour hand 7, which are interlocked by a non-illustrated gear-train, are driven by the motor 13 to display seconds, minutes, and hours. Note that in the first embodiment, the seconds hand 5, the minute hand 6, and the hour hand 7 are driven by one piece of the motor 13, however, a plurality of motors may be provided, for example, a motor that drives the seconds hand 5, and a motor that drives the minute hand 6 and the hour hand 7.

As illustrated in FIG. 2, the IC 20 includes coupling terminals OSC1 and OSC2 to which the crystal oscillator 11 is coupled, input/output terminals P1 and P2 to which the switches S1 and S2 are coupled, power supply terminals VDD and VSS to which the battery 12 is coupled, and output terminals O1 and O2 coupled to a coil 130 of the motor 13.

Note that in the first embodiment, the positive electrode of the battery 12 is coupled to the power supply terminal VDD on the high potential side, the negative electrode is coupled to the power source terminal VSS on the low potential side, where the power source terminal VSS on the low potential side is set to ground potential.

The crystal oscillator 11 is driven by an oscillation circuit 21, which will be described later, to generate an oscillation signal.

The battery 12 is constituted by a primary battery or a secondary battery. In case of the secondary battery, a charge is performed by a non-illustrated solar cell or the like.

The switch S1 receives an input in conjunction with the button 9 at the 2 o'clock position of the electronic watch 1, where the switch S1 is in an ON state in a state when the button 9 is pressed and is in an OFF state in a state when the button 9 is not pressed, for example.

The switch S2 is a slide switch that interfaces with the drawing-out of the crown 8. In the first embodiment, the crown 8 is in the ON state in a state of being drawn out to the first stage, and is in the OFF state at the zero stage.

Circuit Configuration of IC

Figure 3:
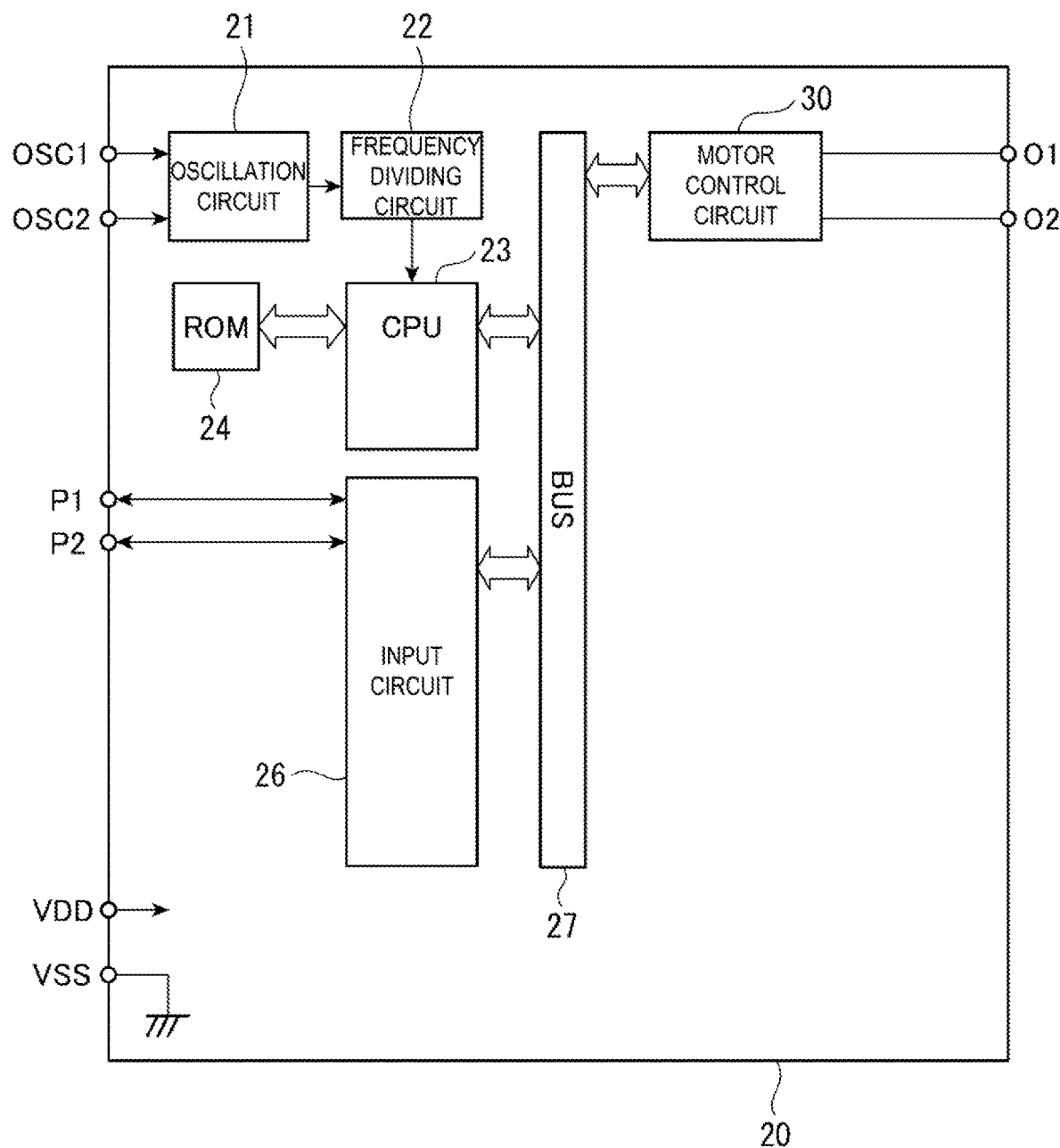
FIG. 3 is a configuration diagram illustrating a configuration of an IC of an electronic watch of a first embodiment.

The IC 20 includes the oscillation circuit 21, a frequency dividing circuit 22, a CPU 23 for controlling the electronic watch 1, a ROM 24, an input/output circuit 26, a bus 27, and a motor control circuit 30, as illustrated in FIG. 3. The abbreviation CPU stands for "Central Processing Unit", and the ROM stands for "Read Only Memory".

The oscillation circuit 21 causes the crystal oscillator 11, which is a reference signal source, to oscillate at high frequency, and outputs an oscillation signal of a prescribed frequency generated by the high frequency oscillation to the frequency dividing circuit 22.

The frequency dividing circuit 22 frequency-divides the output from the oscillation circuit 21 to supply a timing signal, that is, a clock signal to the CPU 23.

The ROM 24 stores various programs to be executed at the CPU 23. In the first embodiment, the ROM 24 stores programs for materializing a basic watch function, and the like.

The CPU 23 executes programs stored in the ROM 24 to materialize the functions described above.

The input/output circuit 26 outputs states of the input/output terminals P1 and P2 to the bus 27. The bus 27 is used for data transfer among the CPU 23, the input/output circuit 26, and the motor control circuit 30, and the like.

The motor control circuit 30 supplies the driving current to the coil 130 of the motor 13 to control the driving of the motor 13 by commands input through the bus 27 from the CPU 23.

Configuration of Motor Control Circuit

Figure 4:
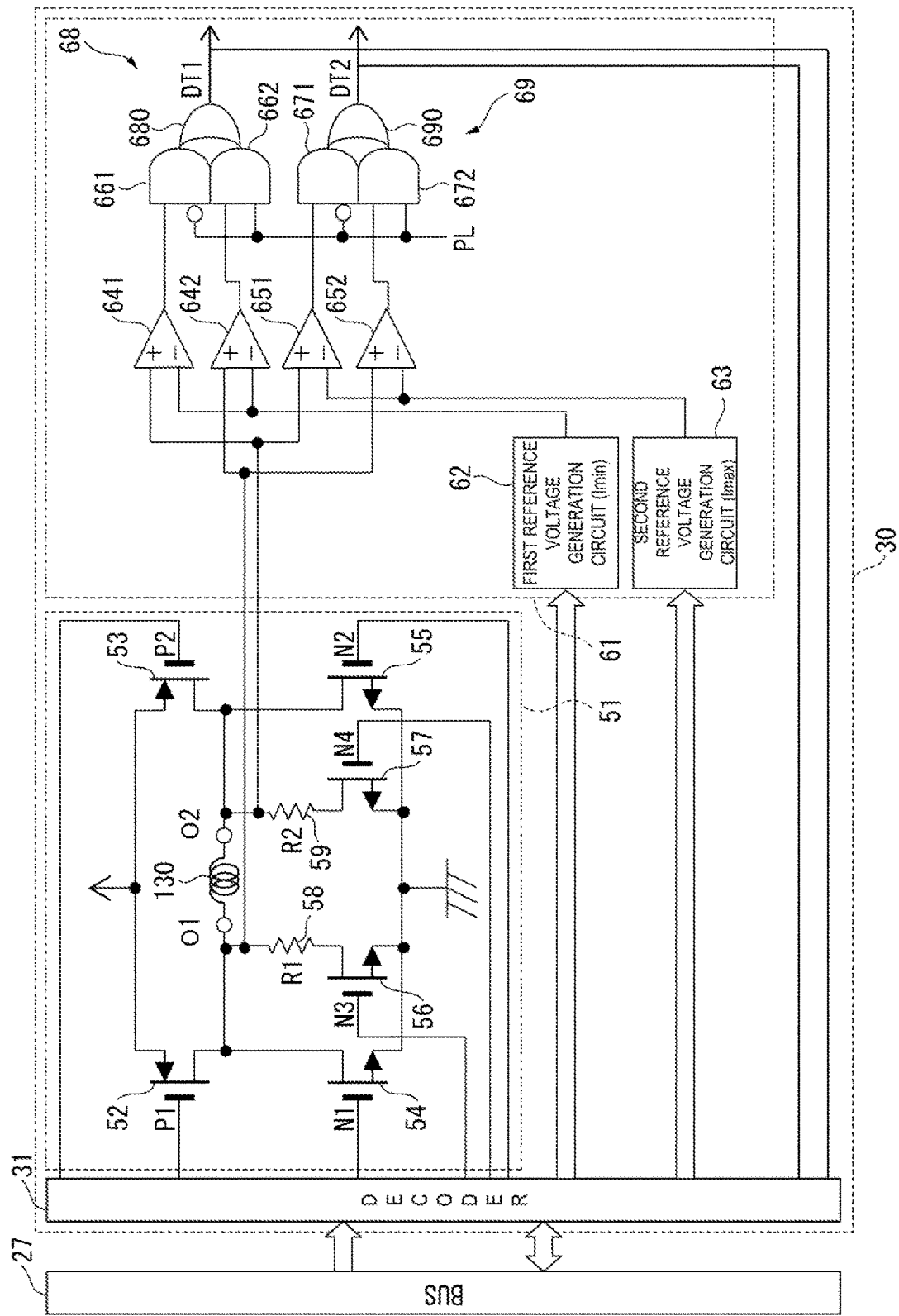
FIG. 4 is a circuit diagram illustrating a configuration of a motor control circuit of an electronic watch of a first embodiment.

As illustrated in FIG. 4, the motor control circuit 30 includes a decoder 31, a driver 51, and a current detection circuit 61, which is a current detector.

The decoder 31, based on the commands input from the CPU 23, outputs gate signals P1, P2, N1, N2, N3, and N4 to the driver 51, as described below.

The driver 51 includes two Pch transistors 52 and 53, four Nch transistors 54, 55, 56, and 57, and two detection resistances 58 and 59. Each of the transistors 52 to 57 is controlled by the gate signals P1, P2, N1, N2, N3, and N4 output from the decoder 31 to supply currents in both positive and negative directions to the coil 130 of the motor 13. Thus, the driver 51 serves as a drive means for outputting a driving current to the coil 130 of the motor 13, to drive the motor 13.

The current detection circuit 61 includes a first reference voltage generation circuit 62, a second reference voltage generation circuit 63, comparators 641, 642, 651, and 652, and composite gates 68 and 69. The composite gate 68 is one element having the same function as the combination of AND circuits 661 and 662 and an OR circuit 680, which are illustrated in FIG. 4. The composite gate 69 is one element having the same function as the combination of AND circuits 671 and 672 and an OR circuit 690.

The comparators 641 and 642 compare the voltages generated at both ends of the detection resistances 58 and 59 having resistance values R1 and R2 with the voltage of the first reference voltage generation circuit 62, respectively.

The AND circuit 661 receives a signal obtained by inverting a drive polarity signal PL output from the decoder 31, and the AND circuit 662 receives the drive polarity signal PL as is, thus, the output from one of the comparators 641 and 642, which is selected by the drive polarity signal PL, is output as a detection signal DT1.

The comparators 651 and 652 compare the voltages generated at both ends of the detection resistances 58 and 59 having the resistance values R1 and R2 with the voltage of the second reference voltage generation circuit 63, respectively.

The AND circuit 671 receives a signal obtained by inverting the drive polarity signal PL, and the AND circuit 671 receives the drive polarity signal PL as is, thus, the output from one of the comparators 651 and 652, which is selected by the drive polarity signal PL, is output as a detection signal DT2.

The first reference voltage generation circuit 62 is set to output a voltage potential corresponding to the voltages generated at both ends of the detection resistances 58 and 59 when the current flowing through the coil 130 is a lower current threshold value Imin.

Thus, when the current I flowing through the coil 130 is not less than the lower current threshold value Imin, the voltages generated at both ends of the detection resistances 58 and 59 exceeds the voltage output from the first reference voltage generation circuit 62, then, the detection signal DT1 becomes a signal at the H level. On the other hand, when the current I falls below the lower current threshold value Imin, the detection signal DT1 becomes a signal at the L level. Thus, the first reference voltage generation circuit 62, the comparators 641 and 642, and the composite gate 68 of the current detection circuit 61 form a lower limit current detector configured to detect that the current I flowing through the coil 130 is less than the lower limit current threshold value Imin, and the detection signal DT1 is a result of detecting the lower limit current detector.

The second reference voltage generation circuit 63 generates a voltage corresponding to an upper current threshold value Imax. Thus, the detection signal DT2 of the current detection circuit 61 becomes a signal at the H level when the current I flowing through the coil 130 exceeds the upper current threshold value Imax, and becomes a signal at the L level when the current I flowing through the coil 130 is not greater than the upper current threshold value Imax. Accordingly, the second reference voltage generation circuit 63, the comparators 651 and 652, and the composite gate 69 of the current detection circuit 61 form an upper limit current detector configured to detect that the current I flowing through the coil 130 exceeds the upper limit current threshold value Imax, and the detection signal DT2 is a result of detecting the upper limit current detector.

Control Processing of Motor Control Circuit

Figure 5:
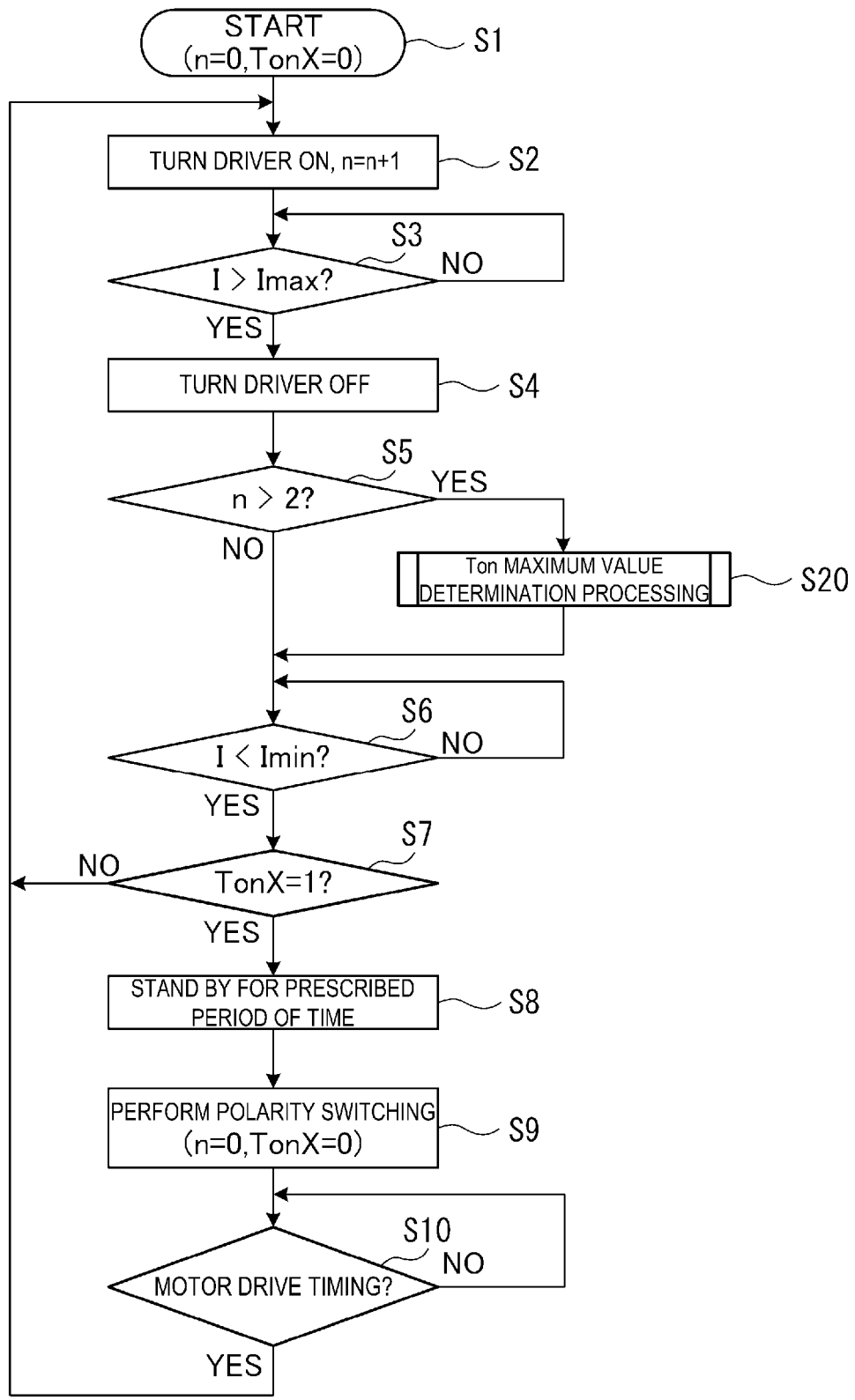
FIG. 5 is an explanatory flowchart illustrating a motor control processing of a first embodiment.
Figure 6:
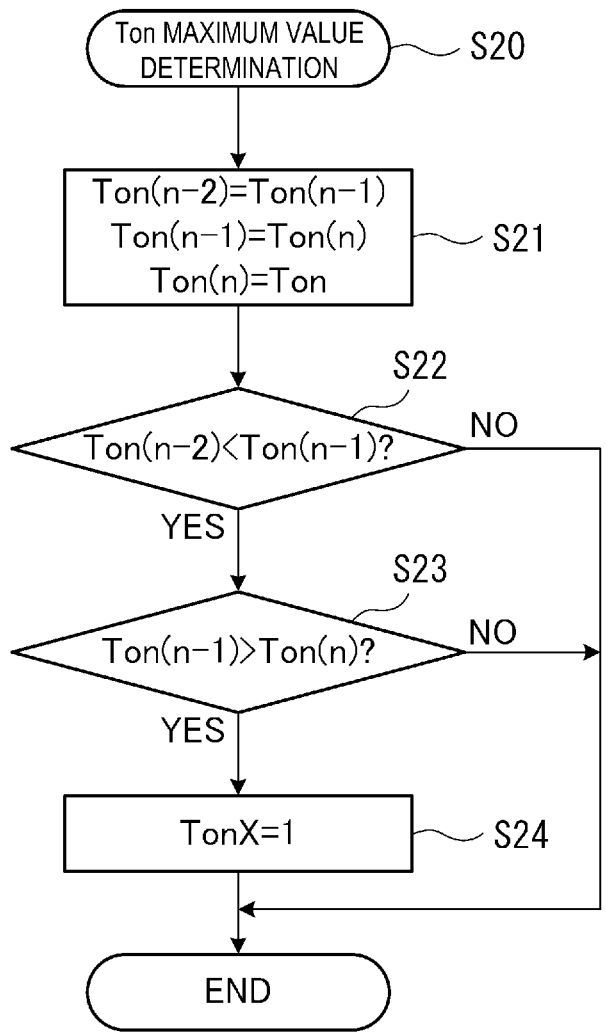
FIG. 6 is an explanatory flowchart illustrating an ON time maximum value determination processing of a first embodiment.

Next, a control by the motor control circuit 30 of the first embodiment will be described with reference to the flowcharts of FIGS. 5 and 6 and the graphs of FIGS. 7 and 8. Note that the control is described below, as an example, when the motor control circuit 30 drives the motor 13 at a frequency of 1 Hz, that is, when the motor control circuit 30 drives one step for each of seconds.

The CPU 23 of the IC 20, upon starting driving control of the motor 13, executes processing of step S1 for performing the initialization setting, to set such that n=0 and TonX=0. The variable n is a variable indicating the number of times that the driver 51 is turned on before executing the polarity switching from the start of the driving control. The variable TonX is a variable of which the initial value is "0", and is set to "1" when detecting that an ON time Ton, which is the duration during which the driver 51 is being turned on, reaches the maximum, that is, when the ON time Ton reaches the maximum value.

Next, the CPU 23 executes step S2 to turn on the driver 51 and add 1 to the variable n. That is, when a command to turn on the driver 51 is output to the decoder 31 from the CPU 23, the decoder 31 turns on the driver 51 of the motor 13 with the gate signals P1, P2, N1, N2, N3, and N4. This causes a driving current in the positive direction to flow through the coil 130 of the motor 13. Note that, in the flowchart and the following descriptions, the phrase "turning on the driver 51" represents controlling the driver 51 in the ON state where a driving current can be caused to flow through the coil 130, and the phrase "turning off the driver 51" represents controlling the driver 51 to the OFF state where a driving current cannot be caused to flow through the coil 130.

In the first embodiment, the driving current supplied to the coil 130 is switched to a first polarity and a second polarity, where in case of the first polarity, a current in the positive direction flows through the coil 130, while in case of the second polarity, a current in the negative direction opposite to the positive direction flows through the coil 130.

In the first embodiment, the transistors 52 and 57 are controlled to be turned on and the transistors 53, 54, 55, and 56 are controlled to be turned off, where the currents flowing through the transistor 52, the terminal O1, the coil 130, the terminal O2, the detection resistance 59, that is, the current flowing through the coil 130 from the terminal O1 toward the terminal O2 is the current in the positive direction. Further, the transistors 53 and 56 are controlled to be turned on and the transistors 52, 54, 55, and 57 are controlled to be turned off, where the current flowing through the transistor 53, the terminal O2, the coil 130, the terminal O1, the detection resistance 58, that is, the current flowing through the coil 130 from the terminal O2 toward the terminal O1 is the current in the negative direction.

Next, the CPU 23 executes processing of step S3 for determining whether the current I flowing through the coil 130 exceeds the upper current threshold value Imax. As described above, the detection signal DT2 of the current detection circuit 61 becomes a signal at the H level that is output when the voltage generated at the detection resistances 58 and 59 exceeds the reference voltage of the second reference voltage generation circuit 63. This allows the CPU 23 to detect the detection signal DT2 via the decoder 31, and to determine as NO in step S3 when the detection signal DT2 is at the L level, and allows the CPU 23, when the detection signal DT2 changes to the H level, to determine as YES in step S3. Note that the upper current threshold value Imax is preset to a suitable level by performing a drive test or the like of the motor 13.

The CPU 23, when determining as YES in step S3, executes step S4 of turning off the driver 51 via the decoder 31. When turning off the driver 51, the ON time Ton is determined.

The CPU 23, upon executing step S4, outputs a command to turn off the driver 51 to the decoder 31, and then the decoder 31 turns off the driver 51 with the gate signals P1, P2, N1, N2, N3, and N4. Specifically, P1 is at the H level, P2 is at the H level, N1 is at the H level, N2 is at the L level, N3 is at the H level, and N4 is at the H level. Accordingly, both ends of the coil 130 are coupled to the power source terminal VSS to be short-circuited, which also stops supplying of the current I from the driver 51 to the coil 130. Thus, the state where no current flows through the coil 130 is a state where the driver 51 is controlled to the OFF state. In the first embodiment, a state where the Pch transistors 52 and 53 and the Nch transistor 55 are turned off and the Nch transistors 54, 56, and 57 are turned on is set to the OFF state at the first polarity of the driver 51.

Next, the CPU 23 executes processing of step S5 for determining whether n is greater than 2. The CPU 23, when the number of times that the driver 51 is turned on is the first time, that is, n is 1, determines as NO in step S5.

On the other hand, the CPU 23, when determining as YES in step S5, that is, when n is not less than 3, executes a Ton maximum value determination processing S20. The Ton maximum value determination processing S20, in which a determination is done using three consecutive ON times Ton as described below, thus, the condition for executing the Ton maximum value determination processing S20 is limited to cases when n is greater than 2, that is, n is not less than 3.

The CPU 23, upon executing the Ton maximum value determination processing S20, executes step S21 in which Ton (n−1) is substituted for Ton (n−2), Ton (n) is substituted for Ton (n−1), and an ON time Ton at the current time is substituted for the Ton (n). Accordingly, the ON time Ton that has terminated immediately beforehand is substituted into Ton (n), the ON time that is one-time beforehand is substituted into Ton (n−1), and the ON time that is two-times beforehand is substituted into Ton (n−2).

Next, the CPU 23 executes step S22 for determining whether the ON time Ton (n−2) that is two-times beforehand is less than the ON time Ton (n−1) that is one-time beforehand, that is, whether the ON time Ton (n−1) that is one-time beforehand is longer than the ON time Ton (n−2) that is two-times beforehand.

The CPU 23, when determining as YES in step S22, executes step S23 for determining whether the ON time Ton (n−1) one-time beforehand is greater than the ON time Ton (n) immediately beforehand, that is, whether the ON time immediately beforehand is shorter than the ON time one-time beforehand.

The CPU 23, when determining as YES in step S23, executes step S24 for setting a variable TonX to 1. That is, the CPU 23, when the second ON time, among three consecutive ON times, is longer than the first and third ON times, determines to detect that the second ON time is the maximum value and the ON time Ton reaches the maximum, sets the variable TonX, which is a flag indicating that the ON time Ton reaches the maximum value, to 1, to terminate the Ton maximum value determination processing S20.

On the other hand, the CPU 23, when determining as NO in steps S22 and S23, determines that the ON time Ton does not reach the maximum value to terminate the Ton maximum value determination processing S20, maintaining the variable TonX at 0 as is.

The CPU 23, when terminating the Ton maximum value determination processing S20 and when determining as NO in step S5 because n is not greater than 2, executes step S6 for determining whether the current I flowing through the coil 130 falls below the lower current threshold value Imin. As described above, the detection signal DT1 of the current detection circuit 61 becomes a signal at the L level that is output when the voltage generated at the detection resistances 58 and 59 falls below the reference voltage of the first reference voltage generation circuit 62. This allows the CPU 23 to detect the detection signal DT1 via the decoder 31, to determine as NO in step S6 when the detection signal DT1 is at the H level and to continue the determination processing in step S6, and allows the CPU 23, when the detection signal DT1 changes to the L level, to determine as YES in step S6. The lower current threshold value Imin is also preset to a suitable level by performing a drive test or the like of the motor 13.

The CPU 23, when determining as YES in step S6, executes step S7 for determining whether the variable TonX is 1, that is, whether the ON time Ton reaches the maximum value. The CPU 23, when determining as NO in step S7, which does not satisfy a polarity switching condition that can be determined by that the ON time Ton reaches the maximum value, returns to step S2 without executing the polarity switching and turns on the driver 51 to drive the motor 13, and adds 1 to the variable n.

The CPU 23, when determining as YES in step S7, executes step S8 and then stands by for a prescribed period of time. The prescribed period of time is a sufficient time to allow the rotor that has stopped supplying the driving current to move through inertia to a static stable position to stop vibrating, and is a fixed value that is predetermined by an experiment or the like.

Next, the CPU 23 executes polarity switching, and executes step S9 for resetting the variable n and the variable TonX to "0".

Then, the CPU 23 executes step S10 for determining whether the next motor drive timing has been reached, and in case of NO in step S10, the CPU 23 continues the determination processing of step S10, while in case of YES, the CPU 23 returns to step S2. For example, the CPU 23, when driving the motor 13 every second and stepwise moving the seconds hand 5, the minute hand 6, and the hour hand 7 every second, determines as NO in step S10 until one second elapses after the start of the driving every second, and determines as YES when one second elapses and returns to step S2, to execute the next stepwise movement.

In step S2, in which the polarity has been switched, the CPU 23 controls the decoder 31 to output a gate signal that is set such that the current flowing through the coil 130 is in the opposite direction to the previous time. Specifically, P1 is at the H level, P2 is at the L level, N1, N2, and N4 are at the L level, and N3 is at the H level. As a result, the Pch transistor 52 is turned off and the Pch transistor 53 is turned on. Further, the Nch transistors 54, 55, and 57 are turned off and the Nch transistor 56 is turned on. Accordingly, the current flows through the Pch transistor 53, the terminal O2, the coil 130, the terminal O1, the detection resistance 58, and the Nch transistor 56. Thus, the driving current output to the coil 130 has the second polarity, and the current in the negative direction, which is the opposite direction to the positive direction, flows through the coil 130. Thus, the state where the current in the negative direction flows through the coil 130 is a state where the driver 51 is controlled to the ON state to thus output a drive signal having the second polarity.

This allows the CPU 23 to repeatedly execute steps S2 to S10 and the Ton maximum value determination processing S20 while alternately switching the first polarity and the second polarity.

As described above, in the electronic watch 1, the CPU 23 functions as a driver controller configured to control the driver 51 and a polarity switcher configured to perform polarity switching when driving the motor 13. The CPU 23 is an example of a controller.

Further, the time during which the CPU 23 stops supplying of the driving current is a time obtained by adding the prescribed time of step S8 starting from a time T2 when detecting that the ON time Ton reaches the maximum to the remaining time from the time when the prescribed time elapses to the next motor drive timing.

Figure 7:
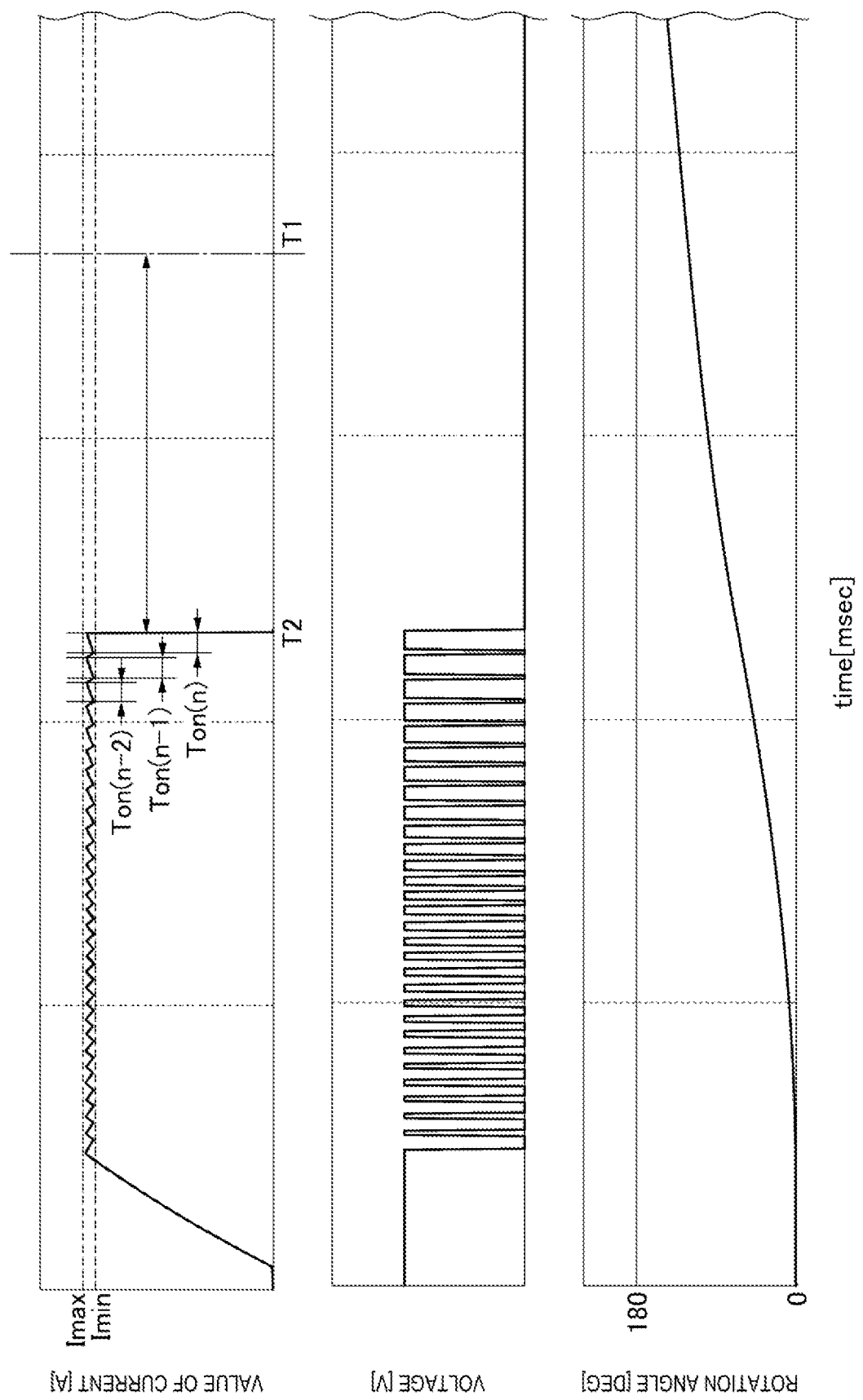
FIG. 7 is a graph illustrating changes in current, voltage, and rotation angle in a motor control processing of a first embodiment.
Figure 8:
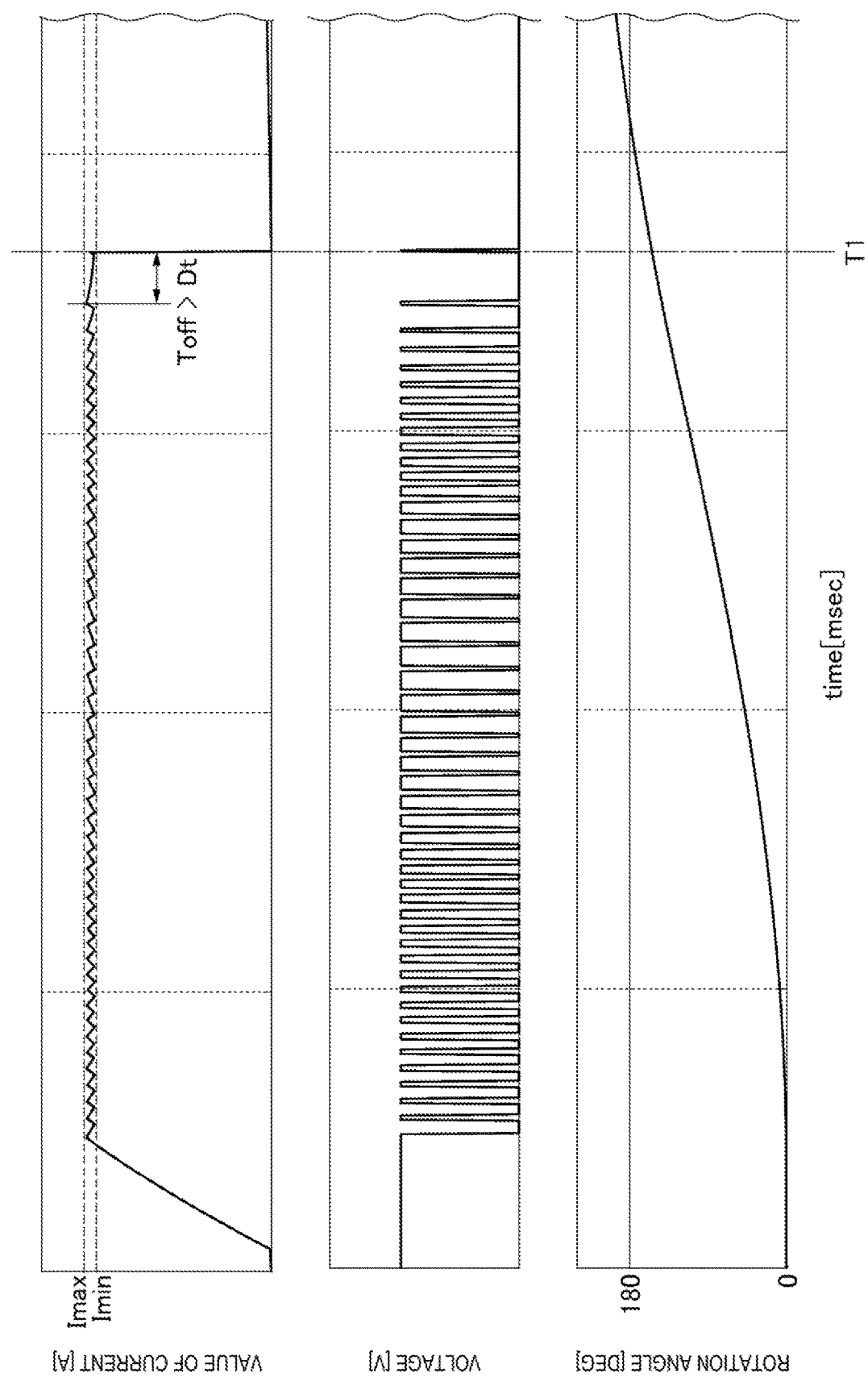
FIG. 8 is a graph illustrating changes in current, voltage, and rotation angle in a motor control processing of a comparative example.

FIG. 7 is a chart in which the current waveform when the control is performed according to the first embodiment is associated with the rotation angle of rotor, and FIG. 8 is a chart in which the current waveform when the polarity switching is controlled based on an OFF time Toff, which is a comparative example, is associated with the rotation angle of rotor.

In FIG. 8, which illustrates the comparative example, when the rotor approaches 180 degrees, the OFF time Toff is also gradually elongated, thus, outputting of a pulse is stopped at a time point when the OFF time Toff exceeds a determination value Dt, that is, at a time point of an elapsed time T1 in FIG. 8.

In contrast, in FIG. 7, which illustrates an example of the first embodiment, outputting of a pulse is stopped at a time point when the ON time Ton reaches the maximum value, that is, at a time point of an elapsed time T2 in FIG. 7. Accordingly, the power consumption can be reduced compared to the comparative example of FIG. 8. For example, provided that the elapsed time T2 is approximately 30% shorter than the elapsed time T1, the power consumption can be reduced by approximately 30% as well.

The time point when the ON time Ton reaches the maximum corresponds to the position from which the force for pulling the rotor back to the position before the pulse is applied reaches the peak, and when detecting the point exceeding this point to stop applying the driving current, the rotor rotates to the position from which the rotor is next pulled through inertia, that is, to the position at which the rotor has rotated by 180 degrees from the original static stable position. Due to the rotation through inertia, the speed is reduced more than when the driving current is applied as in the comparative example, however, it does not matter because there is a sufficient time until the output of the next pulse when driving slower than at frequencies of several tens of Hz, that is, for example, when driving at a frequency of 1 Hz, and the time can be sufficiently ensured for the rotor to stop vibrating at the static stable position.

Advantageous Effects of First Embodiment

The CPU 23 stops supplying the driving current at the time point when detecting that the ON time Ton reaches the maximum, that is, at the time point when terminating the ON time Ton next to the ON time Ton reaching the maximum value, executes polarity switching after a elapse of a prescribed period of time, and drives the motor at the next motor drive timing. Thus, the CPU 23 can reduce erroneously determining the position of the rotor even when the load driven by the motor 13 fluctuates, making it possible to reliably drive the motor 13. That is, the timing at which the ON time Ton reaches the maximum becomes delayed when the load increases and becomes accelerated when the load decreases, however, in either cases, the time point at which the ON time Ton reaches the maximum value corresponds to the position from which the force for pulling the rotor back to the position before the pulse is applied reaches the peak. Thus, when stopping the application of the driving current at the time point when the ON time Ton reaches the maximum value regardless of the magnitude of the load, the rotor is caused to rotate through inertia to the next static stable position and to stop. Accordingly, even when the load driven by the motor 13 fluctuates, erroneously determining the position of the rotor can be reduced, making it possible to reliably drive the motor 13.

The CPU 23, which stops supplying the driving current at the time point when detecting that the ON time Ton reaches the maximum value, can shorten the time period for supplying the driving current to enable reducing the power consumption, compared to when stopping the driving current when the OFF time Toff exceeds the determination value Dt.

In the Ton maximum value determination processing S20 in which the CPU 23 determines that the ON time Ton reaches the maximum value, a determination that the ON time Ton reaches the maximum value is done when the second ON time Ton (n−1) is longer than the ON times Ton (n−2) and Ton (n), which are one-time before and after the second ON time Ton (n−1) among three consecutive ON times Ton (n−2), Ton (n−1), and Ton (n), thus making it possible to easily perform determination in a short time. This allows the CPU 23 to easily detect that the rotor has rotated to a position from which the rotor can rotate through inertia to the next static stable position.

The CPU 23, which can execute the Ton maximum value determination processing S20 every time when turning off the driver 51 until determining as YES in step S7, can accurately and in real-time detect, even if there is a fluctuation in the load, that the ON time Ton reaches the maximum value, that is, that the rotor has rotated to the predefined position described above.

In the first embodiment, the CPU 23 controls the driver 51 via the bus 27 and the decoder 31, and thus, circuit elements can be reduced compared to when the driver 51 is controlled by logic circuits.

Second Embodiment

Next, an electronic watch 1A of the second embodiment will be described based on FIGS. 9 to 14. Members and elements identical to those of the first embodiment will be given identical reference signs and the detailed descriptions will be omitted.

Figure 9:
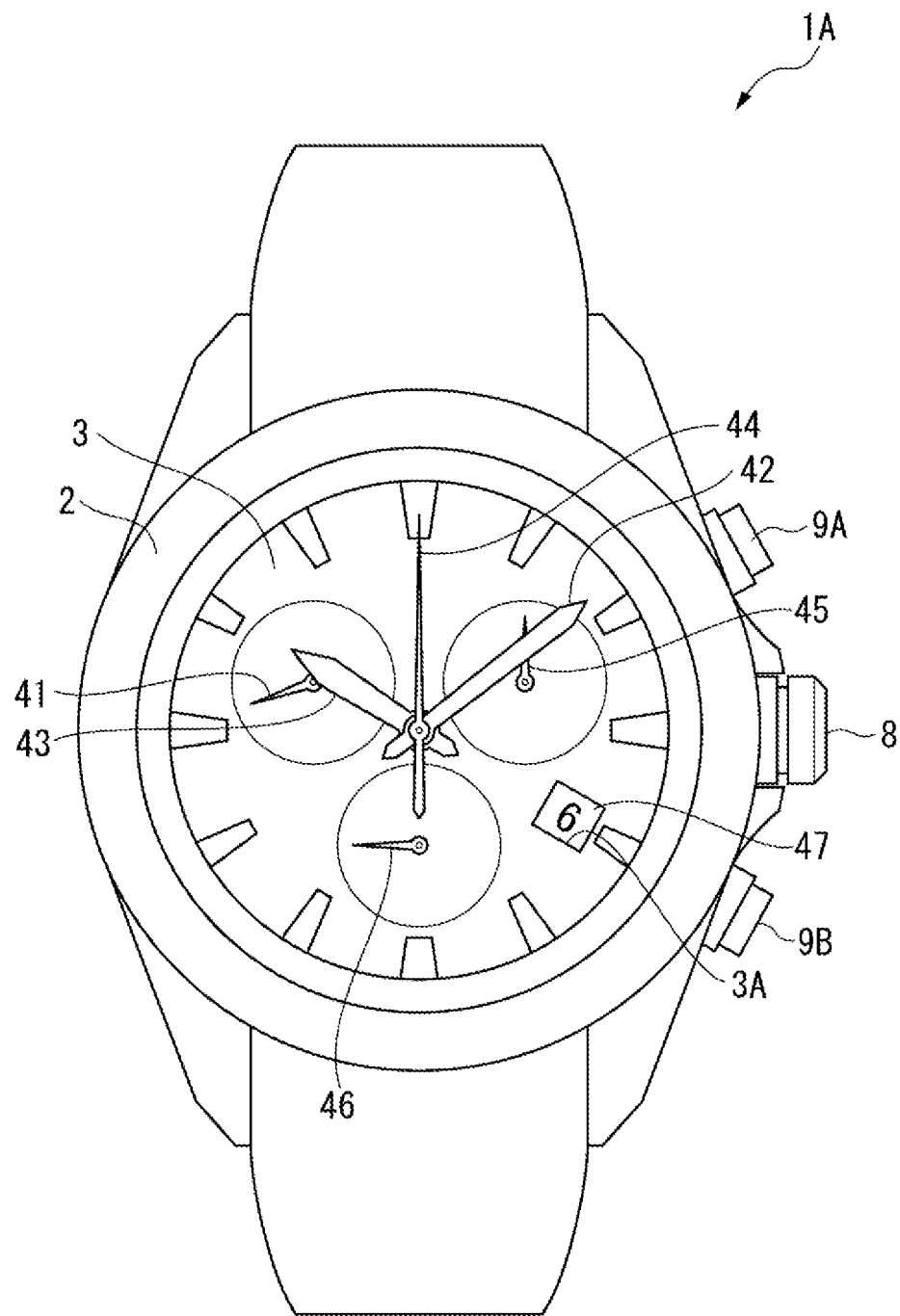
FIG. 9 is a front view illustrating an electronic watch of a second embodiment.

The electronic watch 1A of the second embodiment is an electronic watch having a chronograph function, and includes the outer case 2, the dial 3, the crown 8, and buttons 9A and 9B, as illustrated in FIG. 9. The electronic watch 1A includes three hand spindles arranged coaxially at the planar center position of the dial 3, and the hand spindles are equipped with a minute hand 42, an hour hand 43, and a ⅕ chronograph seconds hand 44, respectively. A hand spindle equipped with a small seconds hand 41 is also disposed in the 10 o'clock direction from the planar center position of the dial 3. A hand spindle equipped with a chronograph minute hand 45 is disposed in the 2 o'clock direction from the planar center position of the dial 3. A hand spindle equipped with a chronograph hour hand 46 that also serves as a mode hand is disposed in the 6 o'clock direction from the planar center position of the dial 3. In the dial 3, a date window 3A is opened, and a date indicator 47 visible from the date window 3A is provided.

Figure 10:
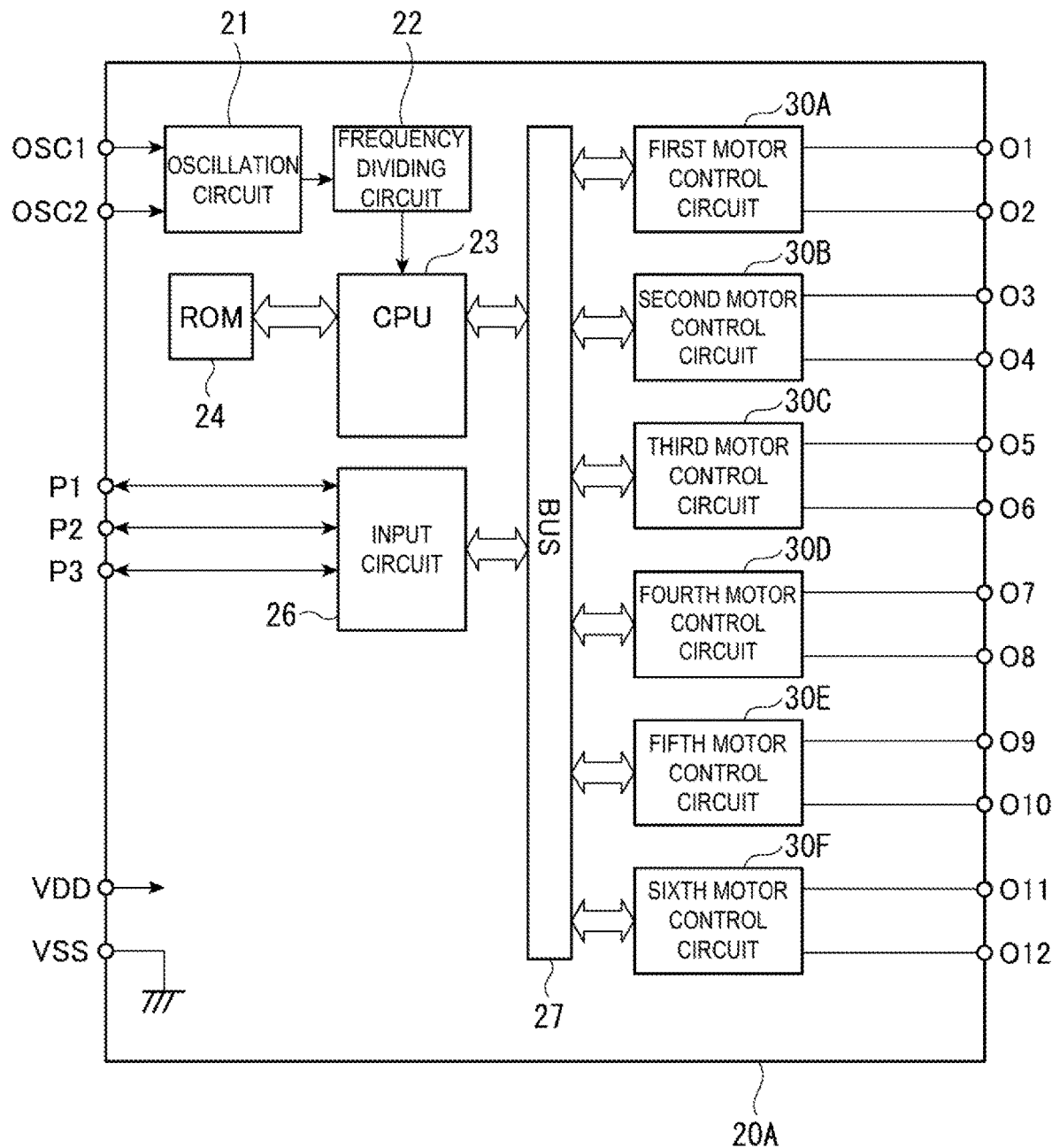
FIG. 10 is a configuration diagram illustrating a configuration of an IC of an electronic watch of a second embodiment.

As illustrated in FIG. 10, the electronic watch 1A includes an IC 20A, which is similar to the IC 20 of the first embodiment, and further includes a first motor control circuit 30A to a sixth motor control circuit 30F.

The first motor control circuit 30A controls driving of a non-illustrated motor that drives the small seconds hand 41, and the second motor control circuit 30B controls driving of a non-illustrated motor that drives the minute hand 42 and the hour hand 43. The third motor control circuit 30C controls driving of a non-illustrated motor that drives the ⅕ chronograph seconds hand 44, the fourth motor control circuit 30D controls driving of a non-illustrated motor that drives the chronograph minute hand 45, and the fifth motor control circuit 30E controls driving of a non-illustrated motor that drives the chronograph hour hand 46. The sixth motor control circuit 30F controls driving of a non-illustrated motor that drives the date indicator 47.

In the IC 20A, the reference sign P1 denotes an input/output terminal to which the switch S1 that detects an input from the button 9A is coupled, the reference sign P2 denotes an input/output terminal to which the switch S2 that detects an input from the button 9B is coupled, and the reference sign P3 denotes an input/output terminal to which the switch S3 that detects an operation of the crown 8 is coupled.

Next, a driving control method performed when fast-forwarding each of the hands in the electronic watch 1A will be described based on the flowchart of FIG. 11. That is, in the second embodiment as well, the driving control method of the first embodiment is utilized, when stepwise moving each of the hands at a constant interval of several tens of Hz or less, that is, when stepwise moving hour-minute-seconds hands in a normal manner, or when executing a time measurement with chronograph hands.

On the other hand, in the driving control method of the first embodiment, the rotor is caused to rotate through inertia after stopping the supply of the driving current and the polarity switching is not performed until a prescribed period of time elapses. This makes it difficult to fast-forward the hands at several hundreds of Hz or greater, for example. In contrast, in the driving control method of the second embodiment, fast-forwarding the hands at a degree of several hundreds of Hz can be performed, as described below.

In the following example, descriptions will be given with the case where the chronograph hour hand 46, which is also utilized as a mode hand, is fast-forwarded to indicate a different mode.

The chronograph hour hand 46 is controlled by the CPU 23 of the IC 20 and the fifth motor control circuit 30E, as in the first embodiment. The chronograph hour hand 46 indicates the battery remaining amount when displaying a normal time, and moves fast-forward to the 0 position when the chronograph function is selected by a button operation. The chronograph hour hand 46 is also fast-forwarded to a position indicating airplane mode when the airplane mode is selected by a button operation, and is fast-forwarded to a position indicating reception mode when a reception operation of receiving a satellite signal is performed.

Figure 11:
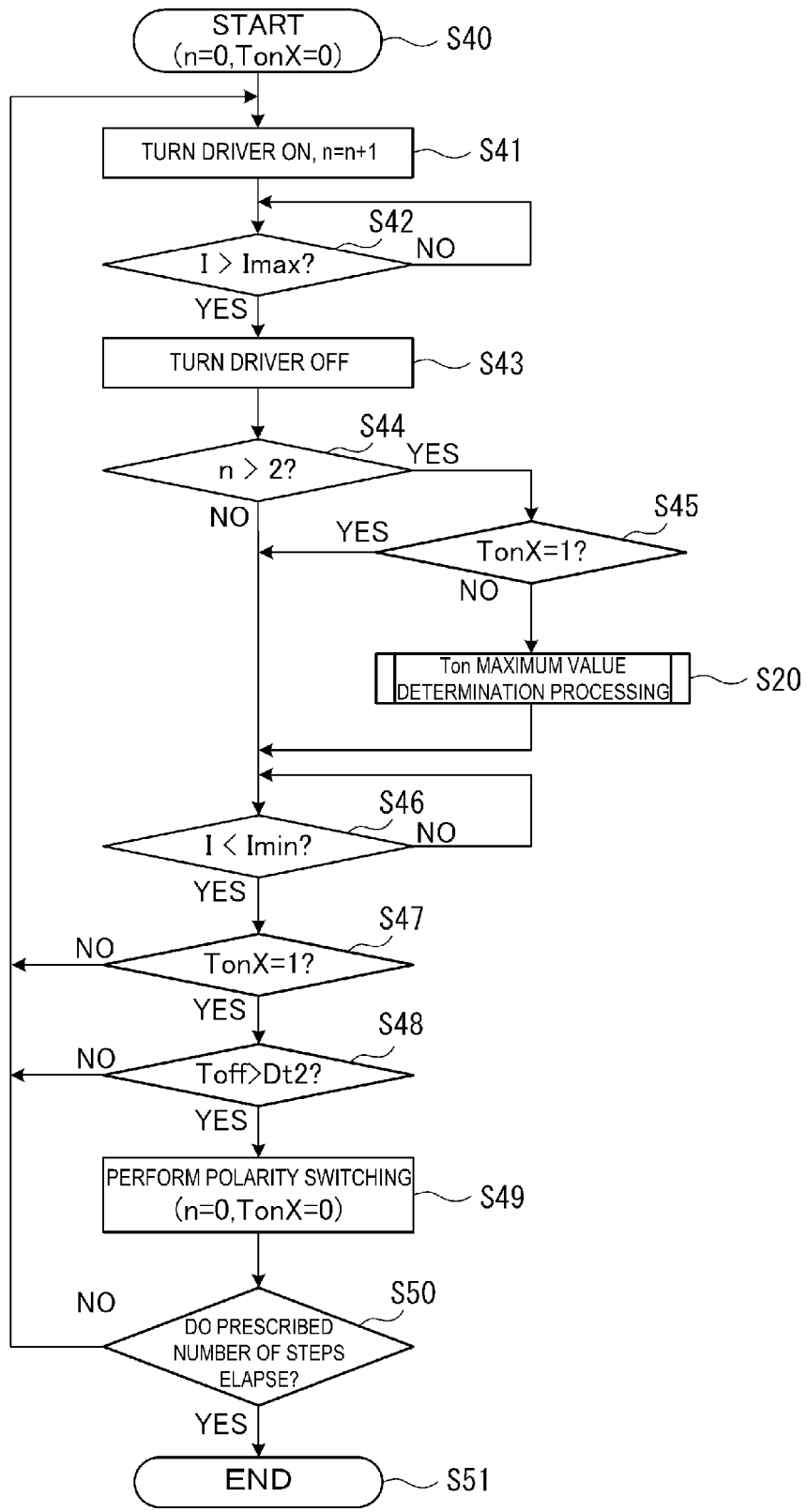
FIG. 11 is an explanatory flowchart illustrating a motor control processing of a second embodiment.

When these fast-forward operations are performed, the CPU 23 executes a processing S40 of the flowchart of FIG. 11. The CPU 23 first executes step S41 to reset the variable n and the variable TonX to "0". The variable n and the variable TonX are the same as those of the first embodiment.

Next, the CPU 23 executes processings in steps S41 to S44, which are the same processings as in steps S2 to S5 of the first embodiment. The CPU 23, upon determining as YES in step S44, executes step S45 for determining whether the variable TonX is 1.

The CPU 23, when determining as NO in step S45, executes the Ton maximum value determination processing S20, which is the same as that of the first embodiment.

The CPU 23, when terminating the Ton maximum value determination processing S20, when determining as NO in step S44 when n is not greater than 2, and when determining as YES in step S45 when the variable TonX is "1" after having already determined as that the maximum value of the ON time Ton has been reached, continually executes, as in step S6 of the first embodiment, step S46 for determining whether the current I flowing through the coil 130 falls below the lower current threshold value Imin until determining as YES in step S46.

The CPU 23, when determining as YES in step S46, executes step S47 for determining whether the variable TonX is 1, as in step S7 of the first embodiment. The CPU 23, when determining as NO in step S47, returns to step S41 without executing the polarity switching and turns on the driver 51 to drive the motor, and adds 1 to the variable n.

The CPU 23, when determining as YES in step S47, executes step S48 for determining whether the OFF time Toff is greater than a determination value Dt2. The determination value Dt2, which is the OFF time Toff when the rotor has rotated to around 180 degrees, is a fixed value that is preset by an experiment or the like.

The CPU 23, when determining as NO in step S48, which indicates that the rotor has not rotated to around 180 degrees, returns to step S41 to continue driving of the motor.

The CPU 23, when determining as YES in step S48, executes polarity switching and executes step S49 for resetting the variable n and the variable TonX to "0", as in step S9 of the first embodiment.

Then, the CPU 23 executes step S50 for determining whether a prescribed number of steps elapse, and in case of NO in step S50, the CPU 23 returns to step S41 to continue driving of the motor. The prescribed number of steps, in case of, for example, the chronograph hour hand 46 that also serves as a mode hand, represents the number of steps required to move from the indicating position at the current time to a predefined position in accordance with the selected mode. The prescribed number of steps, when resetting each of the chronograph hands to the 0 position, also represents the number of steps required to move to the 0 position.

The CPU 23, when determining as YES in step S50, executes step S51 for terminating driving control of the motor.

This allows the CPU 23 to repeatedly execute steps S41 to S50 and the Ton maximum value determination processing S20 while alternately switching the first polarity and the second polarity until driving the motor by the prescribed number of steps.

As described above, in the electronic watch 1A as well, the CPU 23 functions as the driver controller configured to control the driver 51 and the polarity switcher configured to perform polarity switching when driving the motor 13.

Figure 12:
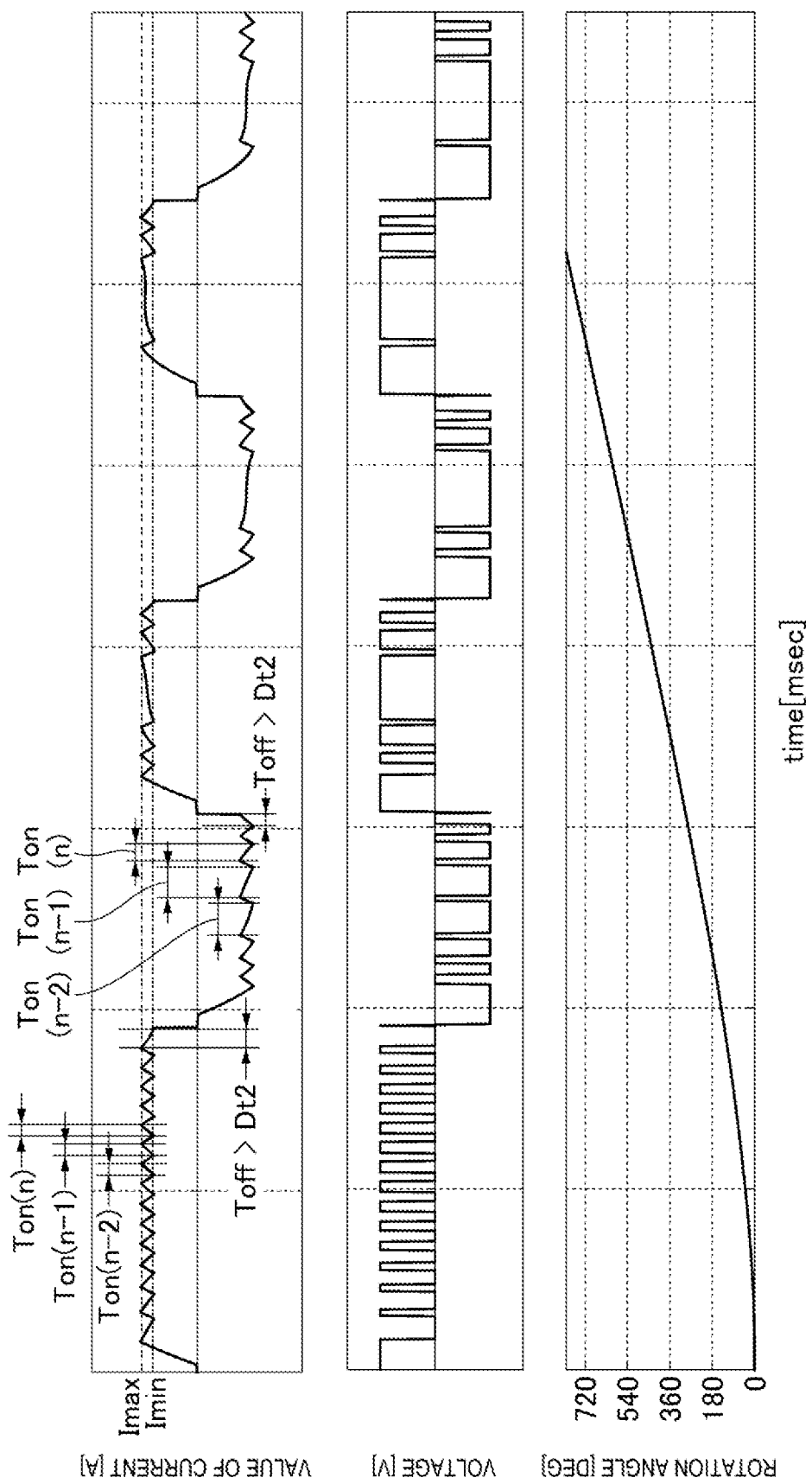
FIG. 12 is a graph illustrating a change in current, voltage, and rotation angle during fast-forward driving at low load in a second embodiment.
Figure 13:
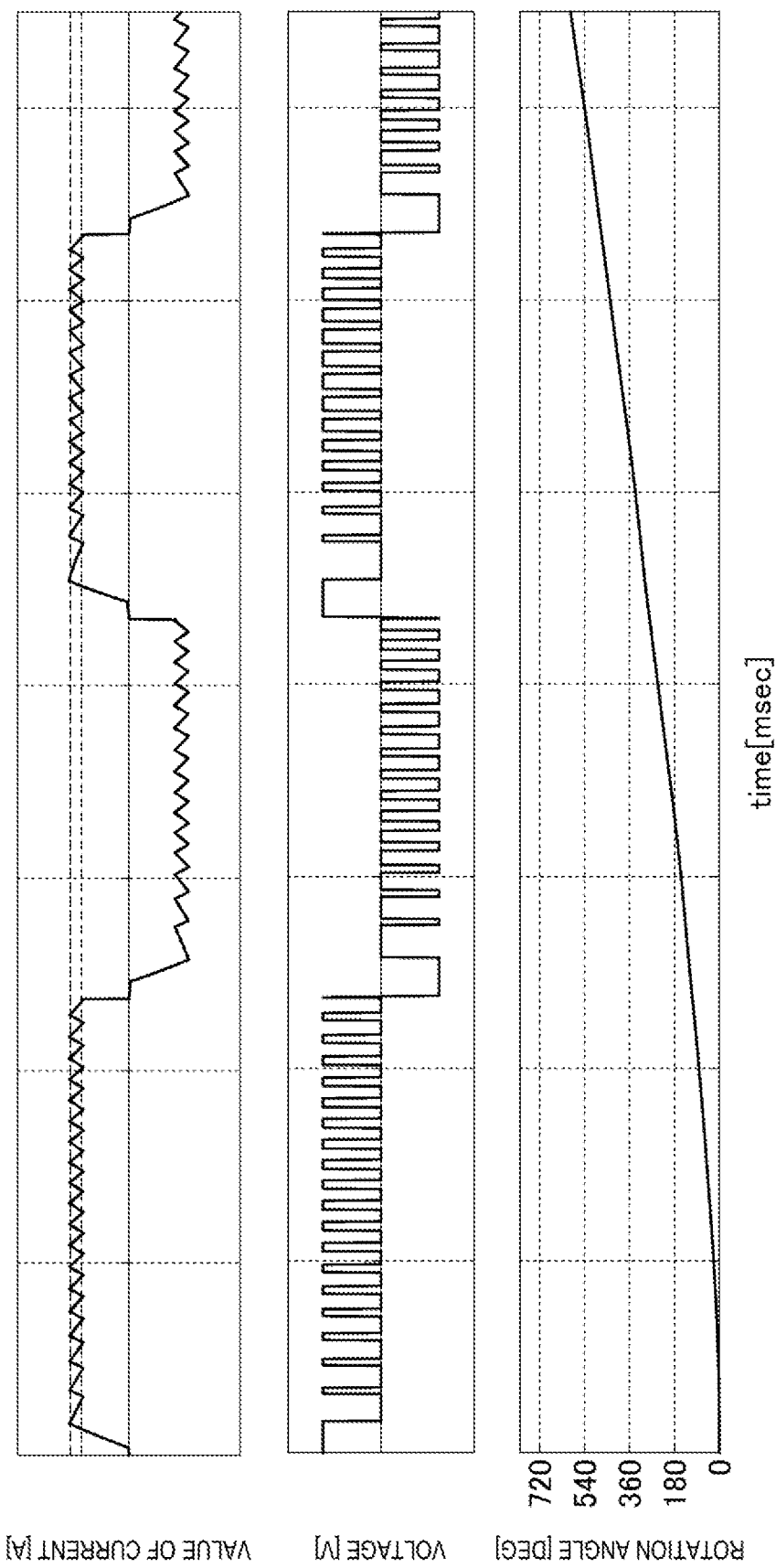
FIG. 13 is a graph illustrating a change in current, voltage, and rotation angle during fast-forward driving at high load in a second embodiment.
Figure 14:
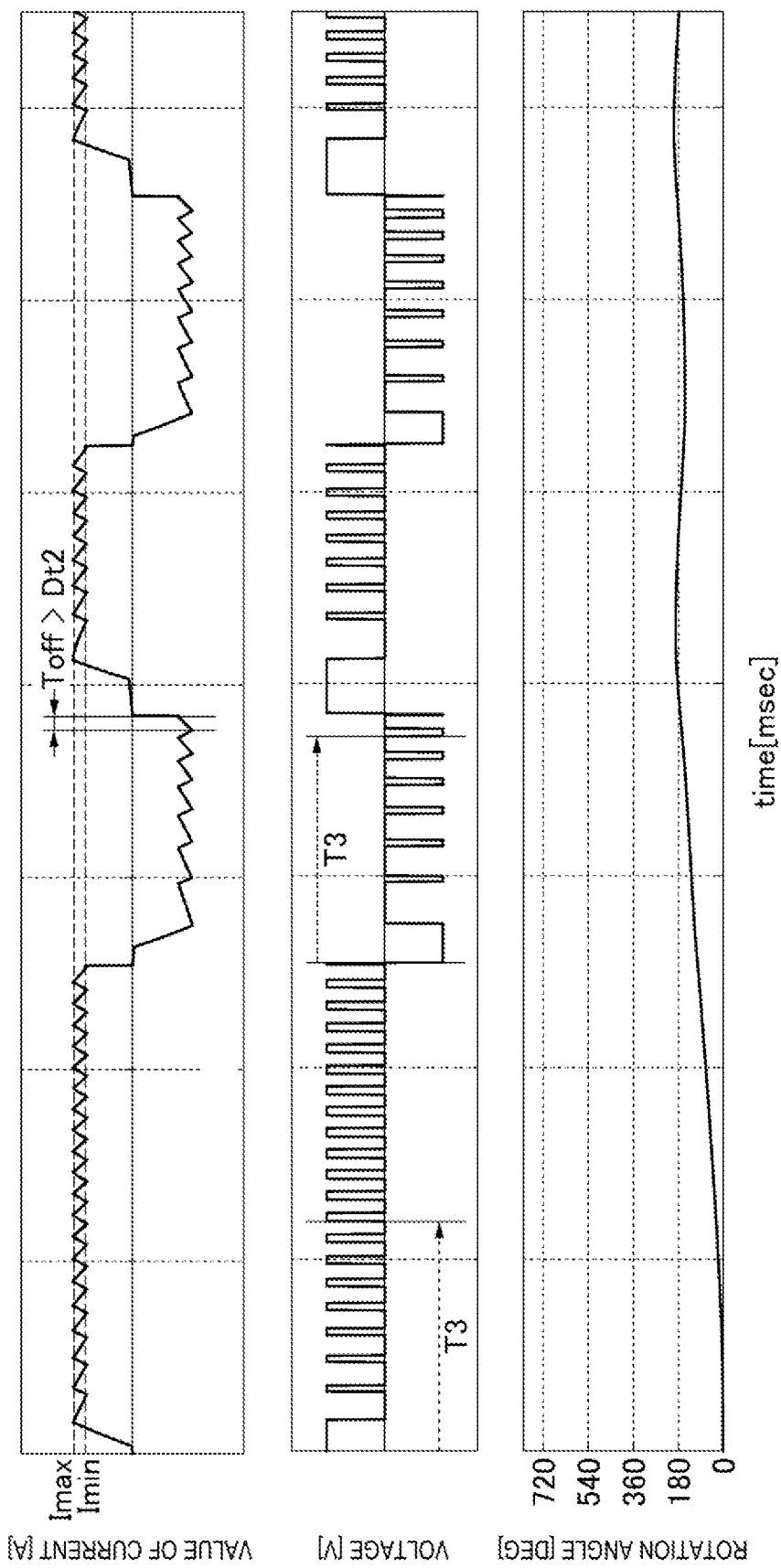
FIG. 14 is a graph illustrating changes in current, voltage, and rotation angle in a motor control processing of a comparative example.

FIG. 12 is a chart in which the current waveform when performing fast-forward driving at low load according to the second embodiment is associated with the rotation angle of rotor, FIG. 13 is a chart in which the current waveform when performing fast-forward driving at high load according to the second embodiment is associated with the rotation angle of rotor, and FIG. 14 is a chart in which the current waveform when performing driving control with setting a fixed mask period, which is a comparative example, is associated with the rotation angle of rotor.

As illustrated in the current waveform charts of FIGS. 12 to 14, when executing polarity switching to continually rotate the motor, the time during which the pulse is applied varies between the first step in which the motor in the stopping state starts to be driven, and the second step and subsequent steps in which continuous driving is performed. This pulse application time also varies depending on the load.

Further, the OFF time Toff may be greater than the determination value Dt2 while applying first several pulses in each of the steps in which the polarity switching is performed. Thus, an erroneous determination that the rotor has rotated, even though the rotor is actually in an unrotated state, is made by comparing the OFF time Toff of the first time after performing the polarity switching with the determination value Dt2.

Accordingly, in the related art, a fixed mask period that is preset from the start of the driving control at each of the polarities is provided, and after the elapse of the mask period, the rotation position of the rotor is assumed by comparing the OFF time Toff with the determination value Dt2. When setting the fixed mask period, the time during which the pulse is applied varies depending on the number of steps from the start of driving the load or the motor as described above, and thus, the mask period corresponding to each of these cases needs to be provided. FIG. 14 illustrates a comparative example in which a fixed mask period T3 is set at each of the times when performing fast-forward driving at high load. In the example of FIG. 14, in the second step after the start of driving the motor, the rotor has only rotated close to 180 degrees at the time point when the fixed mask period T3 elapses. Accordingly, although the ON time Ton, which is also on the increase, does not exceed the maximum value, the OFF time Toff exceeds the determination value Dt2, and thus, an erroneous determination that the rotor has rotated close to 360 degrees is made to perform polarity switching, resulting in the inoperability of the motor.

In contrast, in the second embodiment, as illustrated in FIG. 12, which is an example of the fast-forward driving at low load, and FIG. 13, which is an example of the fast-forward driving at high load, the OFF time Toff is compared with the determination value Dt2 after detecting that the maximum value of the ON time Ton has been reached, rather than providing the fixed mask period. Accordingly, a driving control due to erroneous detection of the rotation position of the rotor can be reduced depending on the fluctuation in the load and the number of steps, which allows the motor to be driven in an appropriate manner.

Advantageous Effects of Second Embodiment

In the second embodiment, it is detected that the ON time Ton reaches the maximum as in the first embodiment. This enables to determine that the rotor has rotated to a position from which the rotor does not return to the original static stable position even when the load driven by the motor 13 fluctuates. Accordingly, setting the fixed mask period becomes unnecessary, making it possible to prevent the motor from being undriven due to inappropriate setting of the fixed mask period, as illustrated in FIG. 14.

The driving current is caused to flow through the coil 130 of the motor even after the ON time Ton reaches the maximum value, and thus, the time until executing the polarity switching can be shortened compared to the first embodiment in which the rotor is caused to rotate through inertia. Further, the switching timing is determined by detecting that the OFF time Toff becomes greater than the determination value Dt2 after the ON time Ton reaches the maximum value, which allows the polarity switching timing to be determined in an appropriate manner. This makes it possible to drive the motor reliably and at a high speed.

Thus, the motor can be driven reliably and at a high speed to a degree of several hundreds of Hz in accordance with the individual circumstances, such as the size of the hand attached to the movement, a temperature variation, a load increase, and the like.

Third Embodiment

Figure 15:
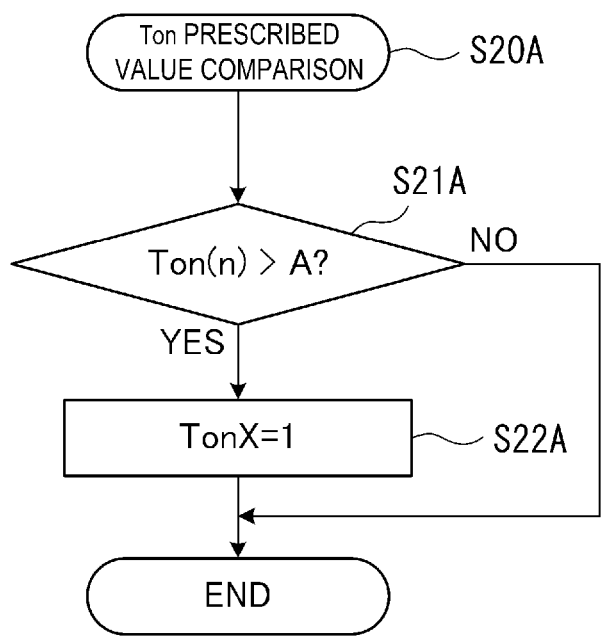
FIG. 15 is an explanatory flowchart illustrating an ON time prescribed value comparison processing of a third embodiment.

The electronic watch of the third embodiment, in place of the Ton maximum value determination processing S20 in the second embodiment, executes a Ton prescribed value comparison processing S20A in FIG. 15. Accordingly, descriptions will be given to only the Ton prescribed value comparison processing S20A.

The CPU 23, upon executing the Ton prescribed value comparison processing S20A in FIG. 15, executes step S21A for determining whether the ON time Ton (n) immediately beforehand is greater than a prescribed value A. The prescribed value A is set to a value that is not less than 70% of a maximum value Ton_max of the ON time Ton calculated by a simulation.

The CPU 23, when determining as YES in step S21A, executes step S22A for setting the variable TonX to "1". That is, the CPU 23, when the ON time Ton is longer than the prescribed value A, sets the variable TonX, which is a flag indicating that the ON time Ton reaches the prescribed value, to "1", to terminate the Ton prescribed value comparison processing S20A.

On the other hand, the CPU 23, when determining as NO in step S21A, determines that the ON time Ton does not reach the prescribed value, and maintains the variable TonX at "0" as is, to terminate the Ton prescribed value comparison processing S20A.

After terminating the Ton prescribed value comparison processing S20A is the same as the second embodiment, thus the descriptions will be omitted.

Note that the reason for setting the prescribed value A to a value that is not less than 70% of the maximum value Ton_max will be described below.

Figure 16:
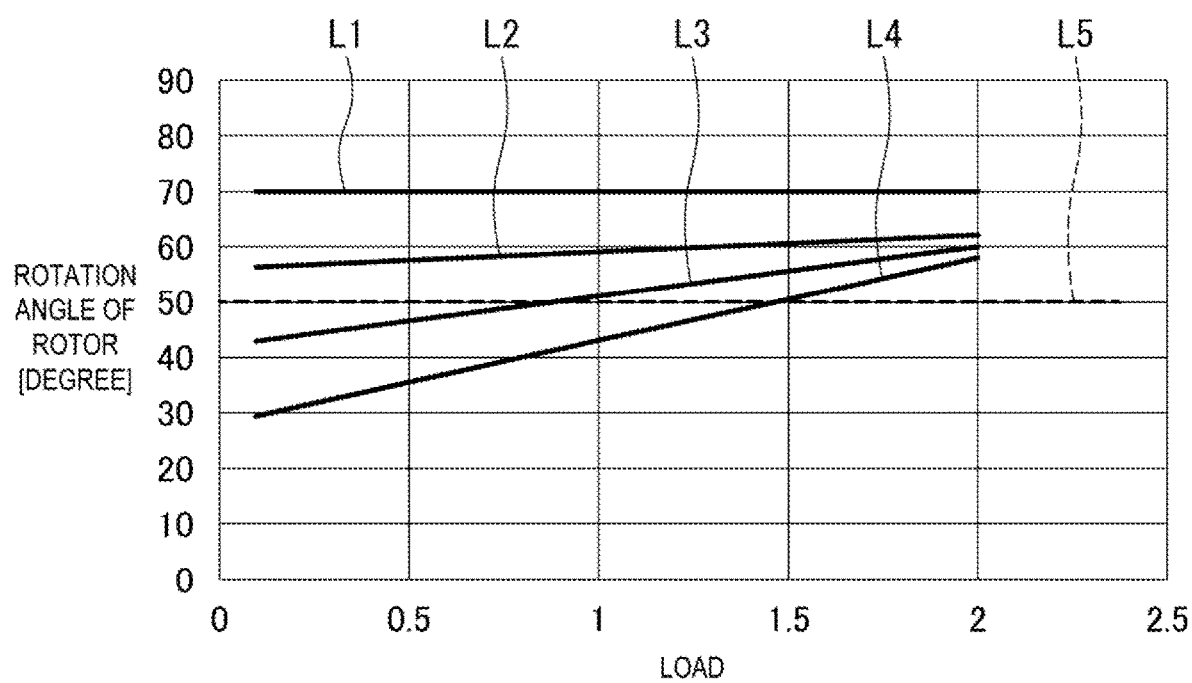
FIG. 16 is a graph illustrating a relationship between a rotation angle of rotor and a load of a third embodiment.

FIG. 16 is a graph of the relationship, calculated by a simulation, between the rotation angle of rotor and the load when the ON time Ton is caused to change. The load is represented by a ratio to a predetermined reference load that is set to "1" by the simulation. That is, the load of 0.5 is a value in half of the reference load of 1, and the load of 2 is a load twice of the reference load of 1.

FIG. 16 is a graph plotting the rotation angle of rotor when setting to 100% of the maximum value Ton_max, which is calculated by a simulation in case of the reference load of 1, and when setting to 80%, 70%, and 60% of the maximum value Ton_max. Specifically, a line L1 indicates the case of 100%, a line L2 indicates the case of 80%, a line L3 indicates the case of 70%, and a line L4 indicates the case of 60%.

A dotted line L5 indicates an angle required for the initial motion, that is, an angle at which the rotor has rotated to a position from which the rotor is hardly pulled back to the position before the pulse is applied. Supposing that the rotation angle of rotor is not less than the dotted line L5, that is, that the rotation angle of rotor is not less than 50 degrees in the example of FIG. 16, a back-electromotive current is sufficiently generated, and the OFF time Toff falls below the determination value Dt2 for the polarity switching determination. This prevents an erroneous detection that the rotor has rotated close to 180 degrees, at the time point when the ON time Ton exceeds the prescribed value A. Thus, the OFF time Toff becomes greater than the determination value Dt2 when the rotor has rotated close to 180 degrees, which allows the polarity switching timing to be detected with high accuracy as in the second embodiment.

As illustrated in FIG. 16, supposing that the prescribed value A is not less than 70% of the maximum value Ton_max at the load of 1.5, as indicated by the lines L1, L2, and L3, the rotation angle of rotor exceeds an angle required for the initial motion, which allows the motor 13 to be driven and the hands to be moved.

At the load of 0.5 and in case of the line L3, the rotor can be rotated in the ON time Ton until the OFF time Toff exceeds the determination value Dt2, because a high speed is achieved due to the low load, although the rotation angle of rotor has not reached the angle required for the initial motion. Thus, the rotation of the rotor can be correctly detected by comparing the OFF time off with the determination value Dt2 after detecting that the ON time Ton exceeds the prescribed value A with setting the prescribed value A to a value that is not less than 70% of the maximum value Ton_max.

On the other hand, as illustrated by the line L4, when setting the prescribed value A to a value less than 70% of the maximum value Ton_max, the possibility increases that the rotor is not sufficiently caused to rotate even if the ON time Ton exceeds the prescribed value A.

Thus, determining whether the ON time Ton exceeds the prescribed value A that is preset in the Ton prescribed value comparison processing S20A, as in the case of the Ton maximum value determination processing S20 in which it is detected that the ON time Ton reaches the maximum value, enables to accurately detect whether the rotor is rotating, enabling control of the stepwise movement of the hands, which can withstand certain degree of the fluctuation in the load.

Advantageous Effects of Third Embodiment

In the third embodiment, the ON time Ton is compared with the prescribed value A in the Ton prescribed value comparison processing S20A, thus, the circuit configuration can be simplified compared to the second embodiment. That is, in order to detect the maximum value of the ON time Ton as in the Ton maximum value determination processing S20, it is necessary to measure a plurality of points and holding the data of these. To hold the data, a circuit is required to convert the analog values into digital values, and a comparison circuit of the data is also required to determine the maximum value. When executing these processings by the CPU, the program for executing the processings becomes longer, and the processing time also becomes longer by the amount of the execution of the program. In addition, when the circuit is constituted by analog circuit, at least twice the amount of the comparison circuit is required compared to the case of comparing with the prescribed value A.

In contrast, according to the third embodiment, it is sufficient to compare the prescribed value A, which is a fixed value, with the ON time Ton, thus, an instant determination can be executed by only providing a comparator for comparison.

As illustrated in FIG. 16, setting the prescribed value A, for example, to be not less than 70% of the maximum value Ton_max enables to correctly detect the rotation state of the rotor regardless of the fluctuation in the load, thus making it possible to perform a motor control also addressing the fluctuation in the load.

Further, the range of the load that can be addressed becomes narrower compared to the case of detecting the maximum value of the ON time Ton, however, a fluctuation in the load such as variation of components in case of a typical model and a fluctuation in the temperature can be sufficiently addressed. The typical model represents those in which the range of the load driven by the motor falls within a certain range with reference to the reference load, such as when the hand driven by the motor is in the form of a hand of typical design.

Moreover, the switching timing is determined by detecting that the OFF time Toff becomes greater than the determination value Dt2 after detecting that the ON time Ton reaches the prescribed value A or greater, which allows the polarity switching timing to be determined in an appropriate manner. This makes it possible to drive the motor reliably and at a high speed.

Thus, the motor can be driven reliably and at a high speed to a degree of several hundreds of Hz in accordance with the individual circumstances, such as the size of the hand attached to the movement, a temperature variation, a load increase, and the like.

Fourth Embodiment

Figure 17:
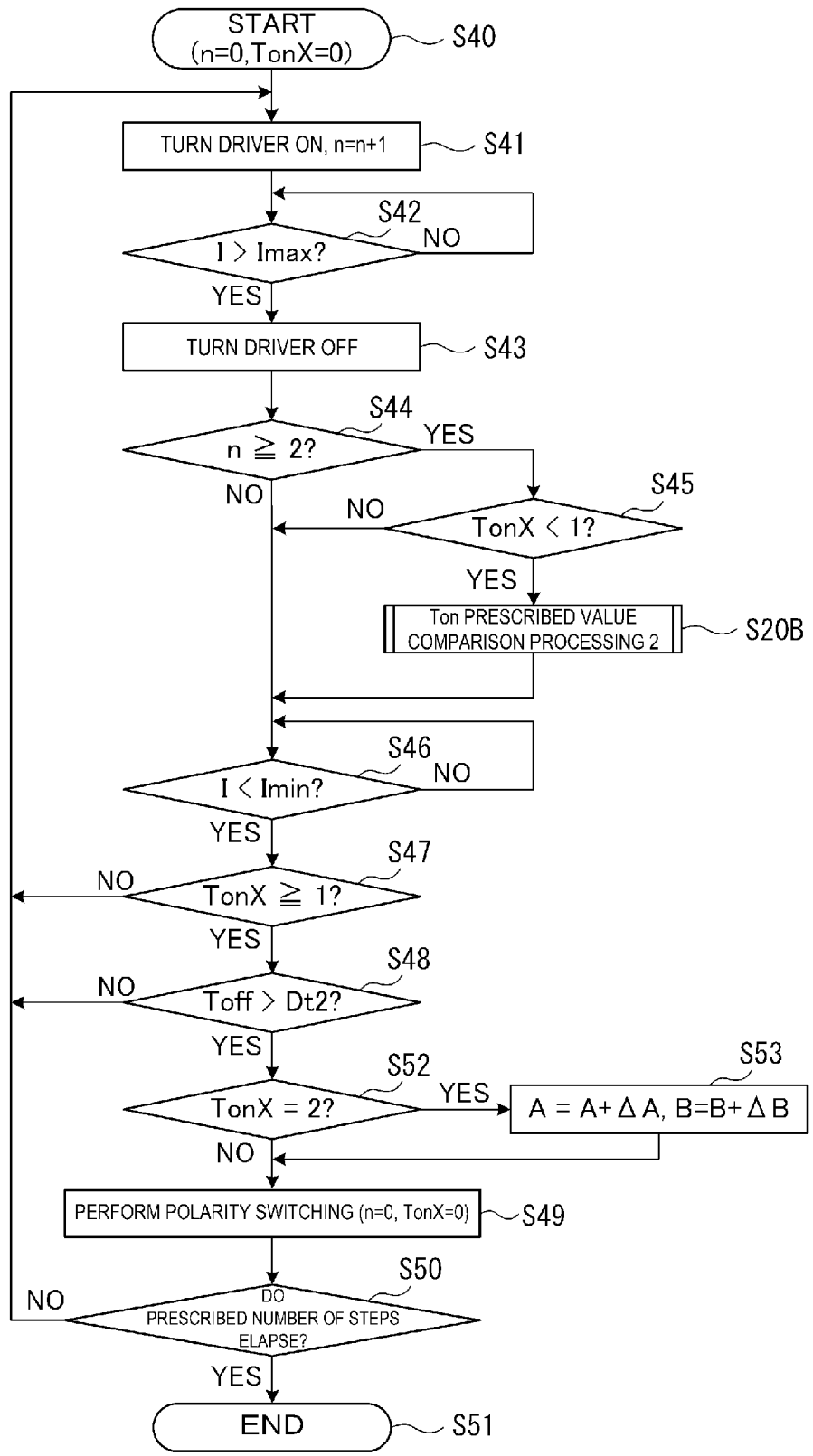
FIG. 17 is an explanatory flowchart illustrating a motor control processing of a fourth embodiment.

Next, an electronic watch of the fourth embodiment will be described with reference to the flowchart of FIGS. 17 and 18. The flowchart of FIG. 17 is a partially modified version of the flowchart illustrated in FIG. 11 of the second embodiment. Accordingly, steps S41 to S51, which are the same as in or similar to the flowchart in FIG. 11, are denoted by the same reference signs, and descriptions of these will be given in a simplified manner.

In FIG. 17, steps S40 to S45 are the same processings as in the second embodiment. Then, in case of YES in step S45, a Ton prescribed value comparison processing 2 of step S20B is executed in place of the Ton maximum value determination processing S20.

Figure 18:
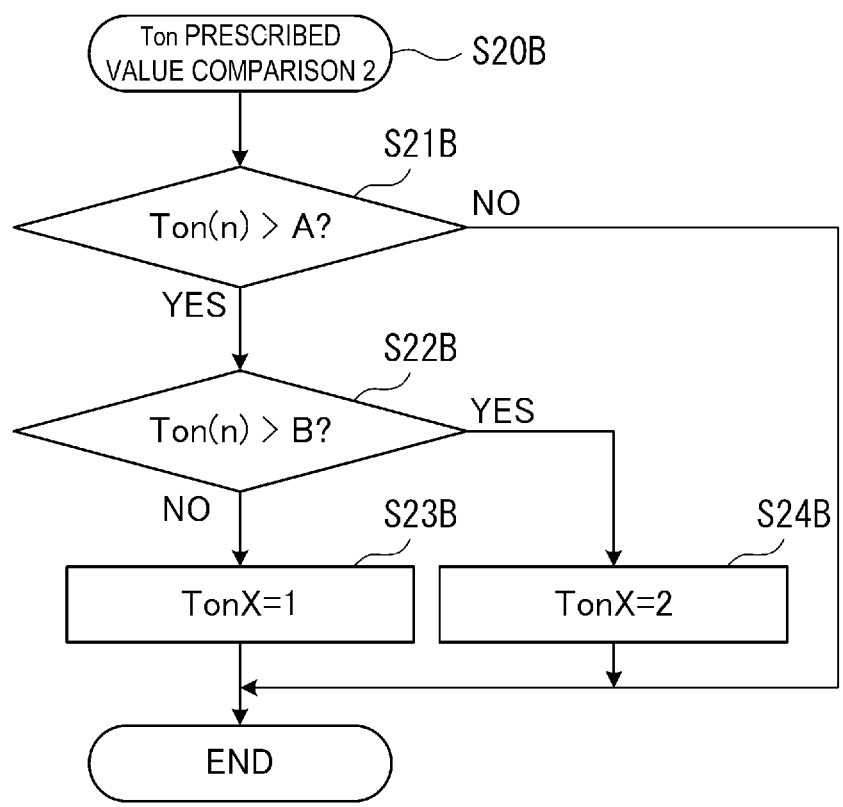
FIG. 18 is an explanatory flowchart illustrating an ON time prescribed value comparison processing of a fourth embodiment.

The CPU 23, upon executing the Ton prescribed value comparison processing 2, executes step S21B for determining whether the ON time Ton (n) immediately beforehand is greater than the prescribed value A, as illustrated in FIG. 18. The prescribed value A is set to a value that is not less than 70% of the maximum value Ton_max calculated by the simulation, for example.

The CPU 23, when determining as NO in step S21B, determines that the ON time Ton does not reach the prescribed value, and maintains the variable TonX at 0 as is, to terminate the Ton prescribed value comparison processing 2.

The CPU 23, when determining as YES in step S21B, executes step S21B for determining whether the ON time Ton (n) immediately beforehand is greater than a prescribed value B. The prescribed value B, which is a value that is greater than the prescribed value A, is a value of +30% of the prescribed value A, for example. That is, the prescribed value B=the prescribed value A+the prescribed value A×0.3.

The CPU 23, when determining as NO in step S22B, executes step S23B for setting the variable TonX to 1. That is, the CPU 23, when the ON time Ton is longer than the prescribed value A and is not greater than the prescribed value B, sets the variable TonX to 1 to terminate the Ton prescribed value comparison processing 2.

On the other hand, the CPU 23, when determining as YES in step S22B, executes step S24B for setting the variable TonX to 2. That is, the CPU 23. when the ON time Ton is longer than the prescribed value B, sets the variable TonX to 2 to terminate the Ton prescribed value comparison processing 2.

The CPU 23, after terminating the Ton prescribed value comparison processing 2 of step S20B, executes steps S46 to S48 as in the second embodiment. Note that the variable TonX may be set to 2, and thus, in step S47, it is determined whether the variable TonX is not less than 1.

Then, the CPU 23, when determining as YES in steps S47 and S48, that is, when determining that the polarity switching condition is satisfied, executes step S52 for determining whether the variable TonX is 2. The CPU 23, when determining as YES in step S52, that is, when the ON time Ton is greater than the prescribed value B, executes step S53 in which AA is added to the prescribed value A and AB is added to the prescribed value B. The AA is a value obtained by adding +10% of the prescribed value A to this value A, for example. That is, the new prescribed value A=the prescribed value A+ΔA=the prescribed value A+the prescribed value A×0.1. Similarly, AB is a value obtained by adding +10% of the prescribed value B to this value B, for example. That is, the new prescribed value B=the prescribed value B+AB=the prescribed value B+the prescribed value B×0.1.

The CPU 23, after executing processing of step S53, executes steps S49 and S50 as in the second embodiment. The CPU 23, when determining as NO in step S52, also executes steps S49 and S50 without changing the prescribed values A and B. Thereafter, the CPU 23 repeatedly executes the processings of steps S41 to S50 until determining as YES in step S50.

Advantageous Effects of First Embodiment

According to the fourth embodiment, the prescribed values A and B are corrected when the ON time Ton is greater than the prescribed value B, and thus, the rotation position of the rotor can be detected with high accuracy compared to when only the comparison is made with the prescribed value A of the third embodiment. In addition, the ON time only needs be compared with the prescribed values A and B, thus the circuit configuration can be simplified and the detection can be easily done compared to when detecting the maximum value of the ON time of the second embodiment. In particular, it suffices that two comparators for the comparison with the prescribed value A and the prescribed value B be provided, thus making it possible to simplify the circuit configuration.

Further, it is determined that the drive state of the motor is inappropriate when the ON time Ton exceeds the prescribed value B, and then the prescribed values A and B are changed. Thus, even when the loads are greatly different, an appropriate determination value can be obtained by performing confirmation driving for a while after the initial motion, and thereafter the rotation position of the rotor can be detected with high accuracy to stably perform driving.

Modified Example of Fourth Embodiment

Note that the method for changing the prescribed value A is not limited to a method in which the ON time Ton is compared with the prescribed value B, and a method in which a detection of the rotation of the rotor using a sensor, a determination of the rotation of the rotor of determining from the pulse length, or the like may be used in conjunction with the method, and a processing may be executed in which the prescribed value A is determined to be inappropriate when those determinations turn out to be NG and then the prescribed value A is changed.

Further, three or more prescribed values for the comparison with the ON time Ton may be set, where the prescribed values may be changed in a plurality of steps such as +10%, +20%, and the like.

Other Embodiments

Note that the present disclosure is not limited to the embodiments described above, and variations, modifications, and the like within the scope in which the aim of the present disclosure can be achieved are included in the present disclosure.

The Ton maximum value determination processing S20 is not limited to the examples of the above-described embodiments. For example, depending on the setting of the upper current threshold value Imax, the lower current threshold value Imin, or the like, the rotor may be caused to rotate, by the first trial after performing polarity switching, to a position from which the rotor does not return to the original static stable position, that is, a position of the rotor when the ON time Ton reaches the maximum value in each of the embodiments. When performing driving control of a motor having such characteristics, it may be determined to detect that the ON time Ton reaches the maximum when confirming that the ON time Ton is continually decreased because the ON time Ton of the first time becomes the longest and then the ON time Ton is sequentially shortened. That is, the CPU 23 may determine to detect that the first ON time is the maximum value and the ON time Ton reaches the maximum when the first ON time is longer than the second ON time among two consecutive ON times, or when the first ON time, among three consecutive ON times, is longer than the second ON time and the second ON time is longer than the third ON time.

In the above-described embodiments, the driver 51 is controlled by the CPU 23, and the driver 51 may be controlled by logic circuits as well. When the driver controller is configured by the logic circuits, the power consumption can be reduced compared to when the driver controller is configured by the CPU 23. In addition, the CPU 23 may be constituted by one piece of an IC or a plurality of pieces of an IC.

What is claimed is:

1. An electronic watch comprising:
a motor including a coil;
a driver controlled to an ON state for supplying a driving current to the coil and to an OFF state for not supplying the driving current;
a controller configured to control the driver to the ON state or the OFF state depending on a value of a current flowing through the coil and switch a polarity of the driving current when a prescribed condition is satisfied after detecting that an ON time, which is a duration of the ON state, reaches a maximum.

2. The electronic watch of claim 1, wherein
the prescribed condition is that, after the controller detects that the ON time reaches the maximum, an OFF time, which is a duration of the OFF state of the driver, exceeds a preset determination value.

3. The electronic watch of claim 1, wherein
the prescribed condition is that a preset time elapses from a time when the controller detects that the ON time reaches the maximum.

4. The electronic watch of claim 3, wherein
the controller is configured to stop supplying the driving current to the coil from a time when detecting that the ON time reaches the maximum, and is configured to resume supplying the driving current to the coil when switching the polarity of the driving current.

5. The electronic watch of claim 1, wherein
the controller is configured to determine that the ON time reaches the maximum when a second ON time, among three consecutive ON times, is longer than first and third ON times.

6. The electronic watch of claim 1, wherein
the controller is configured to determine that the ON time reaches the maximum when a first ON time, among a plurality of consecutive ON times, is longer than a second ON time.

7. A method for controlling an electronic watch, the electronic watch including
a motor including a coil, and
a driver controlled to an ON state for supplying a driving current to the coil and to an OFF state for not supplying the driving current,
the method comprising:
controlling the driver to the ON state or the OFF state depending on a value of a current flowing through the coil; and
switching a polarity of the driving current when a prescribed condition is satisfied after detecting that an ON time, which is a duration of the ON state, reaches a maximum.

8. An electronic watch comprising:
a motor including a coil;
a driver controlled to an ON state for supplying a driving current to the coil and to an OFF state for not supplying the driving current; and
a controller configured to control the driver to the ON state or the OFF state depending on a value of a current flowing through the coil and switch a polarity of the driving current when a prescribed condition is satisfied after detecting that an ON time, which is a duration of the ON state, reaches a prescribed value or greater,
wherein the prescribed value is not less than 70% of a maximum value of the ON time measured in advance.

9. The electronic watch of claim 8, wherein
the prescribed condition is that an OFF time, which is a duration of the OFF state of the driver, exceeds a preset determination value.

10. The electronic watch of claim 8, wherein
the controller is configured to determine a drive state of the motor, and to change the prescribed value when the drive state is inappropriate.

* * * * *